(12) United States Patent
Kalm et al.

(10) Patent No.: US 10,913,603 B1
(45) Date of Patent: Feb. 9, 2021

(54) STACKABLE INVENTORY STORAGE MODULE HAVING HELICAL DRIVE

(71) Applicant: Amazon Technologies, Inc., Seattle, WA (US)

(72) Inventors: William Scott Kalm, Seattle, WA (US); Vahideh Kamranzadeh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 16/037,424

(22) Filed: Jul. 17, 2018

(51) Int. Cl.
| B65G 1/06 | (2006.01) |
|---|---|
| B65G 1/137 | (2006.01) |
| B65G 1/12 | (2006.01) |
| B65G 37/00 | (2006.01) |
| B65G 69/24 | (2006.01) |
| B65G 1/02 | (2006.01) |
| B65G 1/133 | (2006.01) |
| B65G 1/04 | (2006.01) |
| G05B 19/418 | (2006.01) |
| B65G 69/26 | (2006.01) |

(52) U.S. Cl.
CPC ............... *B65G 1/06* (2013.01); *B65G 1/023* (2013.01); *B65G 1/0478* (2013.01); *B65G 1/12* (2013.01); *B65G 1/133* (2013.01); *B65G 1/1373* (2013.01); *B65G 1/1378* (2013.01); *B65G 37/005* (2013.01); *B65G 69/24* (2013.01); *B65G 69/26* (2013.01); *G05B 19/418* (2013.01)

(58) Field of Classification Search
CPC .......... B65G 69/24; B65G 69/26; B65G 1/06; B65G 37/005; B65G 1/12
See application file for complete search history.

(56) References Cited

U.S. PATENT DOCUMENTS

| 431,067 A | 7/1890 | Lieb |
| 3,296,880 A | 1/1967 | Maroth |
| 3,308,674 A | 3/1967 | Maroth |
| 3,329,036 A | 7/1967 | Whittaker |
| 3,779,257 A * | 12/1973 | Wenger .................. G07F 1/047 453/49 |
| 4,440,038 A | 4/1984 | Potter |
| 4,665,765 A | 5/1987 | Heine |
| 4,909,099 A | 3/1990 | Ulbing |

(Continued)

FOREIGN PATENT DOCUMENTS

WO    WO 2018/136441 A1    7/2018

*Primary Examiner* — Thomas Randazzo
(74) *Attorney, Agent, or Firm* — BakerHostetler

(57) ABSTRACT

In one embodiment, an inventory storage module has a plurality of conveyor segments that define a movement path that has a closed shape, and at least one actuator that can move inventory storage containers along the movement path. Each actuator has a roller having a cylindrical body that has a first end, a second end that are offset from the first end along a central axis, and a cylindrical outer surface that extends from the first end to the second end. Each actuator has a helical track disposed around the cylindrical outer surface in a helical pattern. Further, each actuator has at least one track follower that can ride along the helical track when the roller is rotated about the central axis so as to move the inventory storage containers along an axial direction that is substantially parallel to the central axis.

17 Claims, 13 Drawing Sheets

(56) References Cited

U.S. PATENT DOCUMENTS

| | | | |
|---|---|---|---|
| 8,011,264 B2* | 9/2011 | Tsubono | B62D 5/0451 74/424.91 |
| 2004/0007440 A1* | 1/2004 | Doan | B62D 65/18 198/468.8 |
| 2006/0070473 A1 | 4/2006 | Yang | |
| 2007/0137331 A1 | 6/2007 | Kachouh | |
| 2008/0282826 A1 | 11/2008 | Pan et al. | |
| 2013/0105283 A1 | 5/2013 | Dudek et al. | |
| 2016/0115003 A1* | 4/2016 | Biondich | B66F 9/06 414/800 |
| 2017/0225890 A1* | 8/2017 | Li | B65G 1/1378 |
| 2018/0172122 A1 | 6/2018 | Parmar | |
| 2018/0287458 A1 | 10/2018 | Parmar et al. | |
| 2018/0351247 A1* | 12/2018 | Hall | G01S 7/02 |
| 2019/0307614 A1* | 10/2019 | Shea | B65B 35/30 |

\* cited by examiner

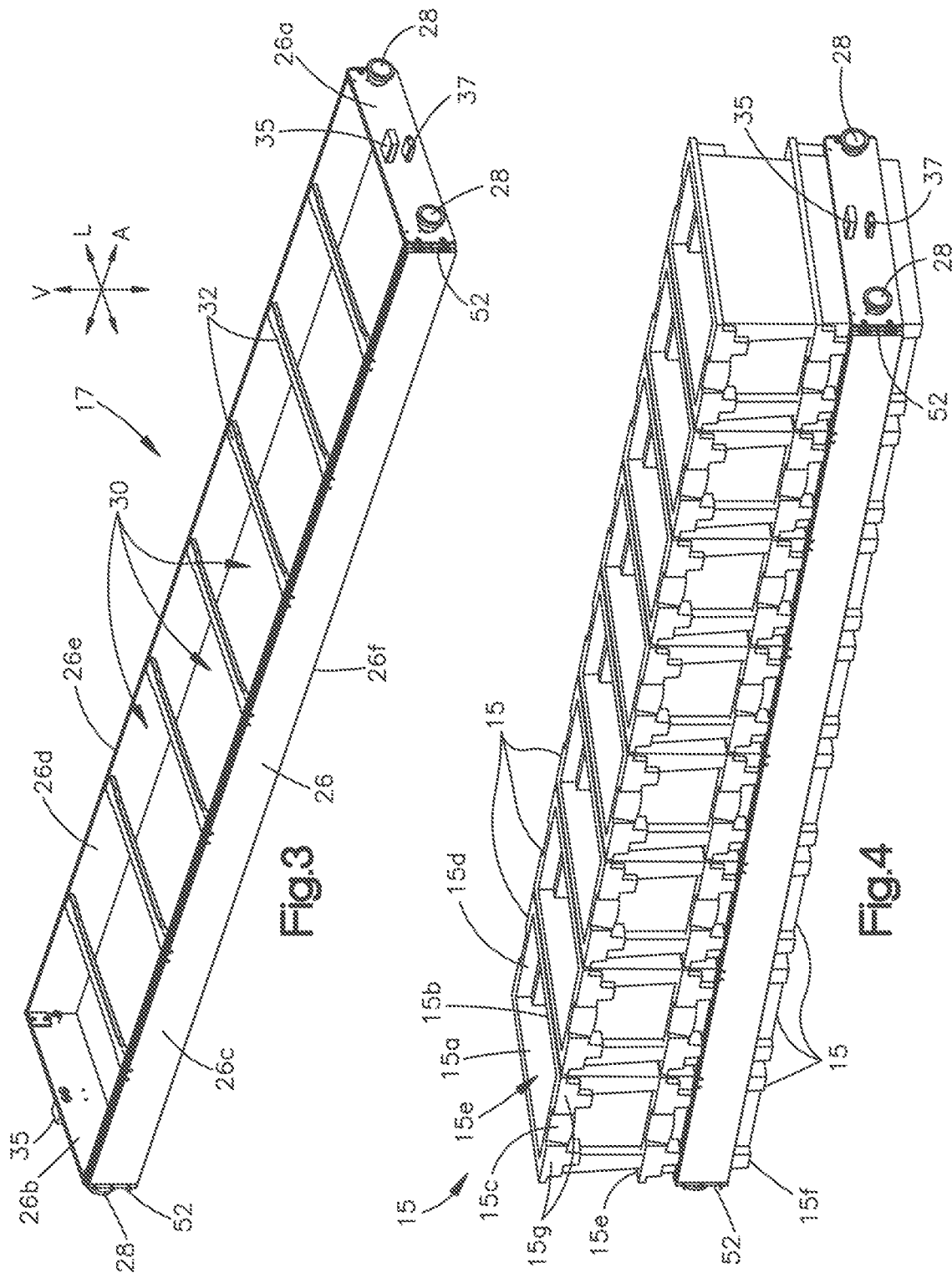

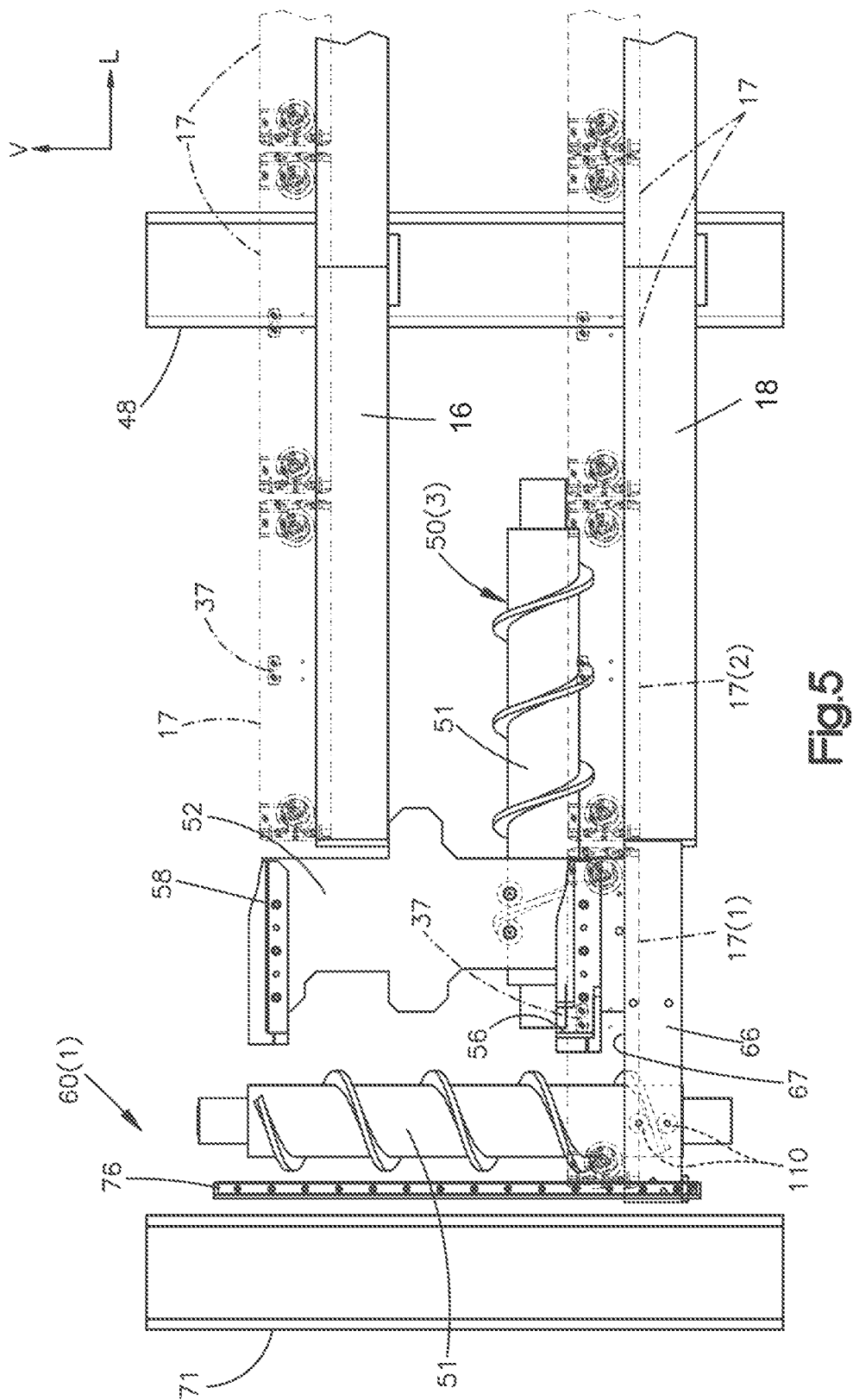

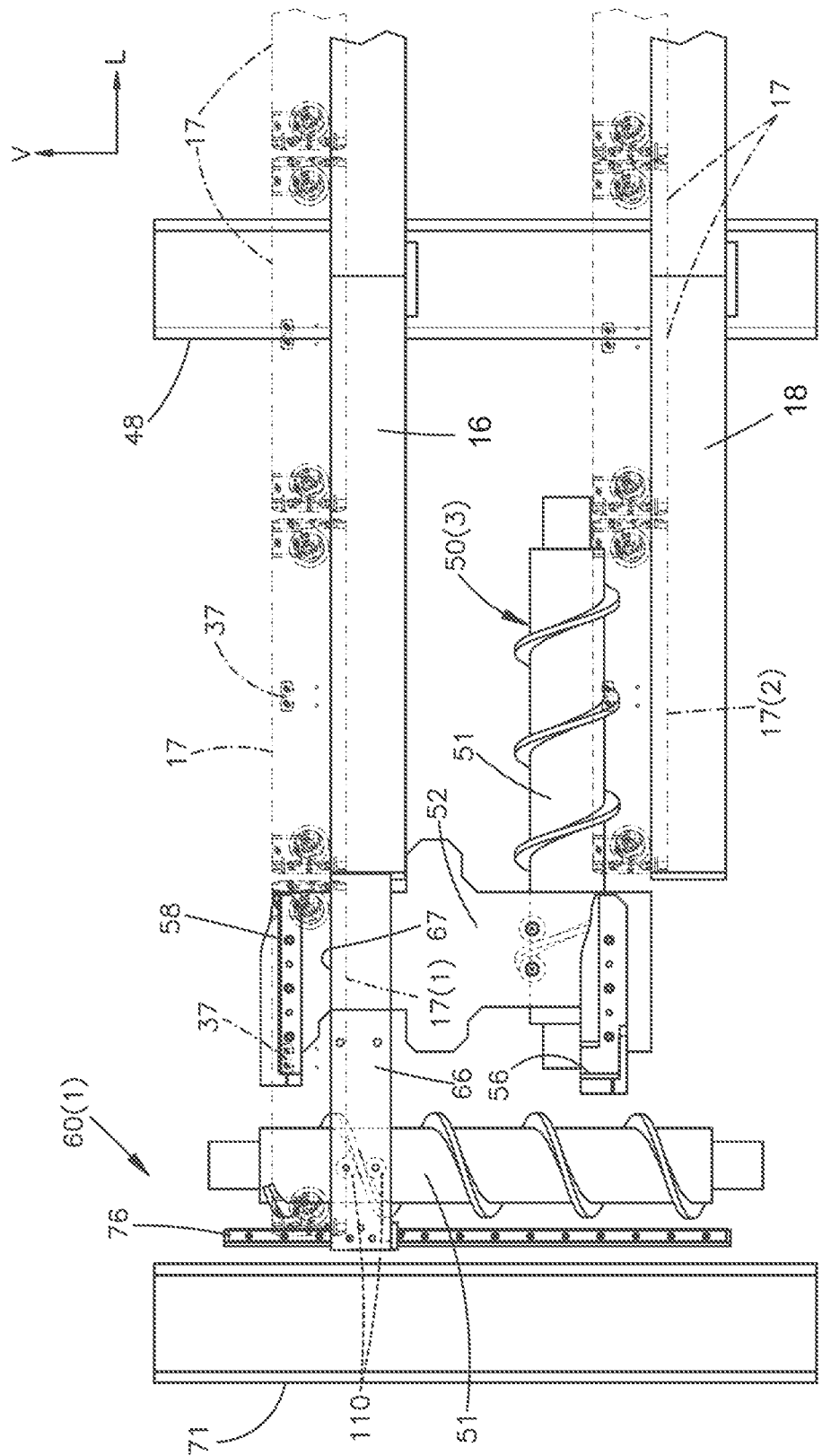

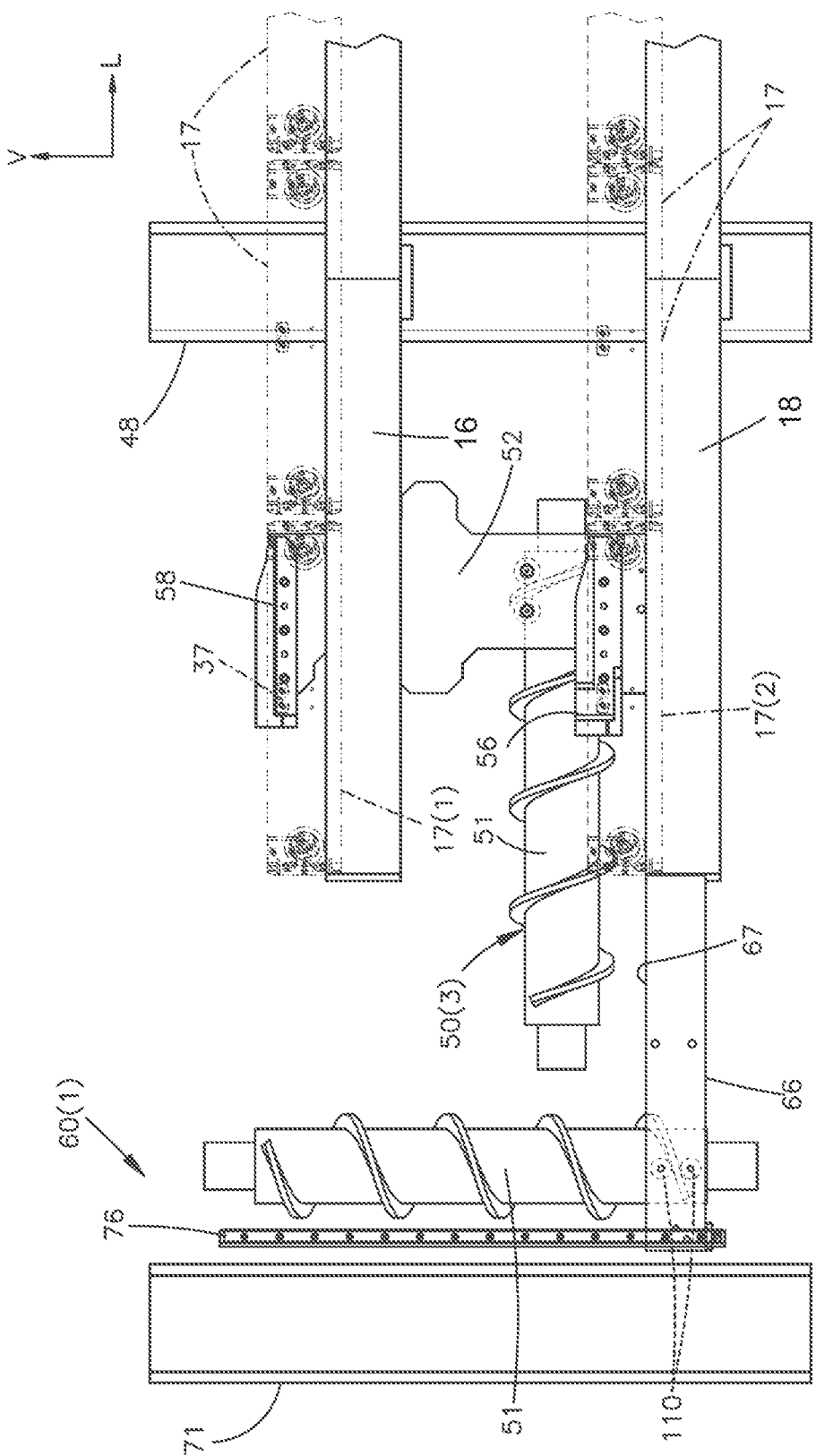

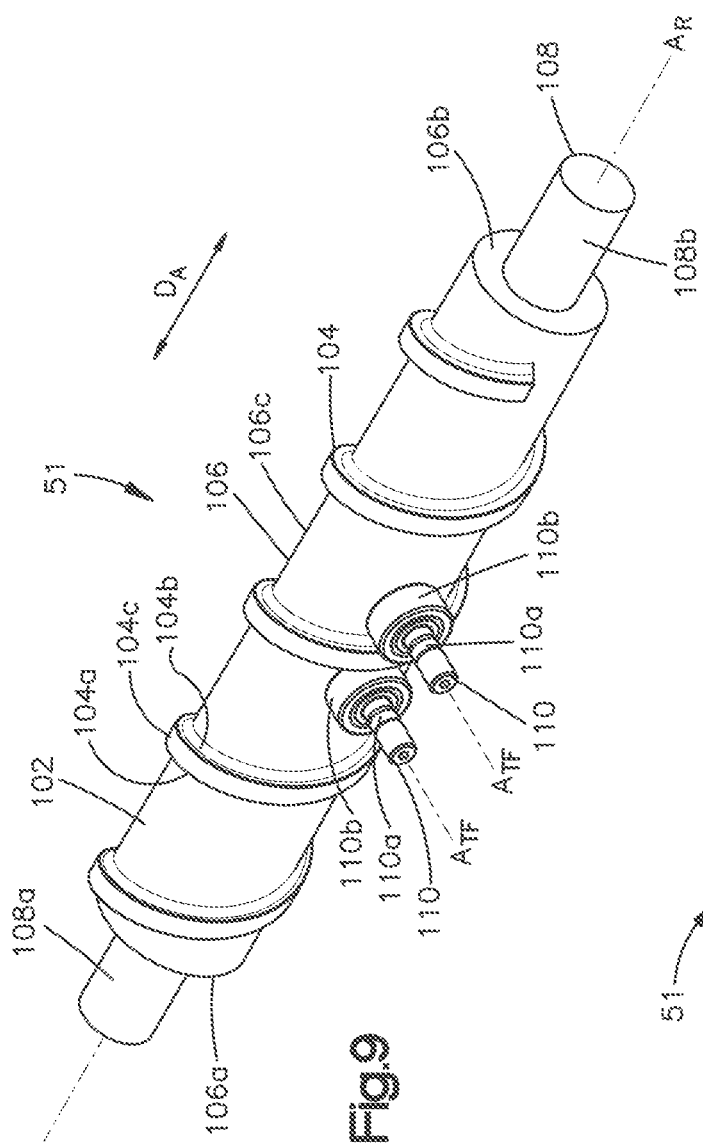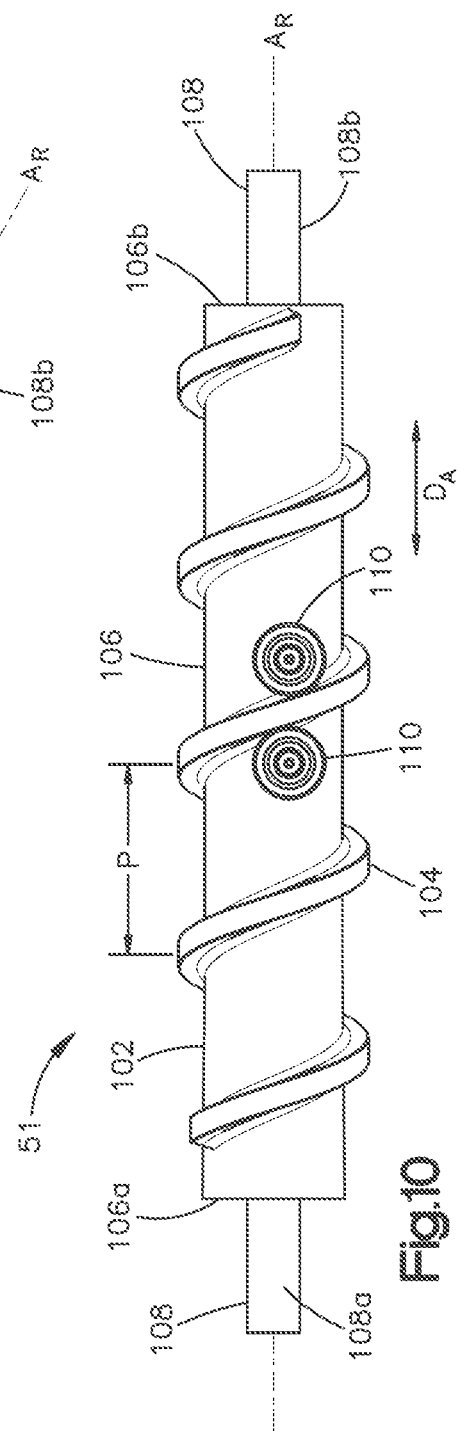

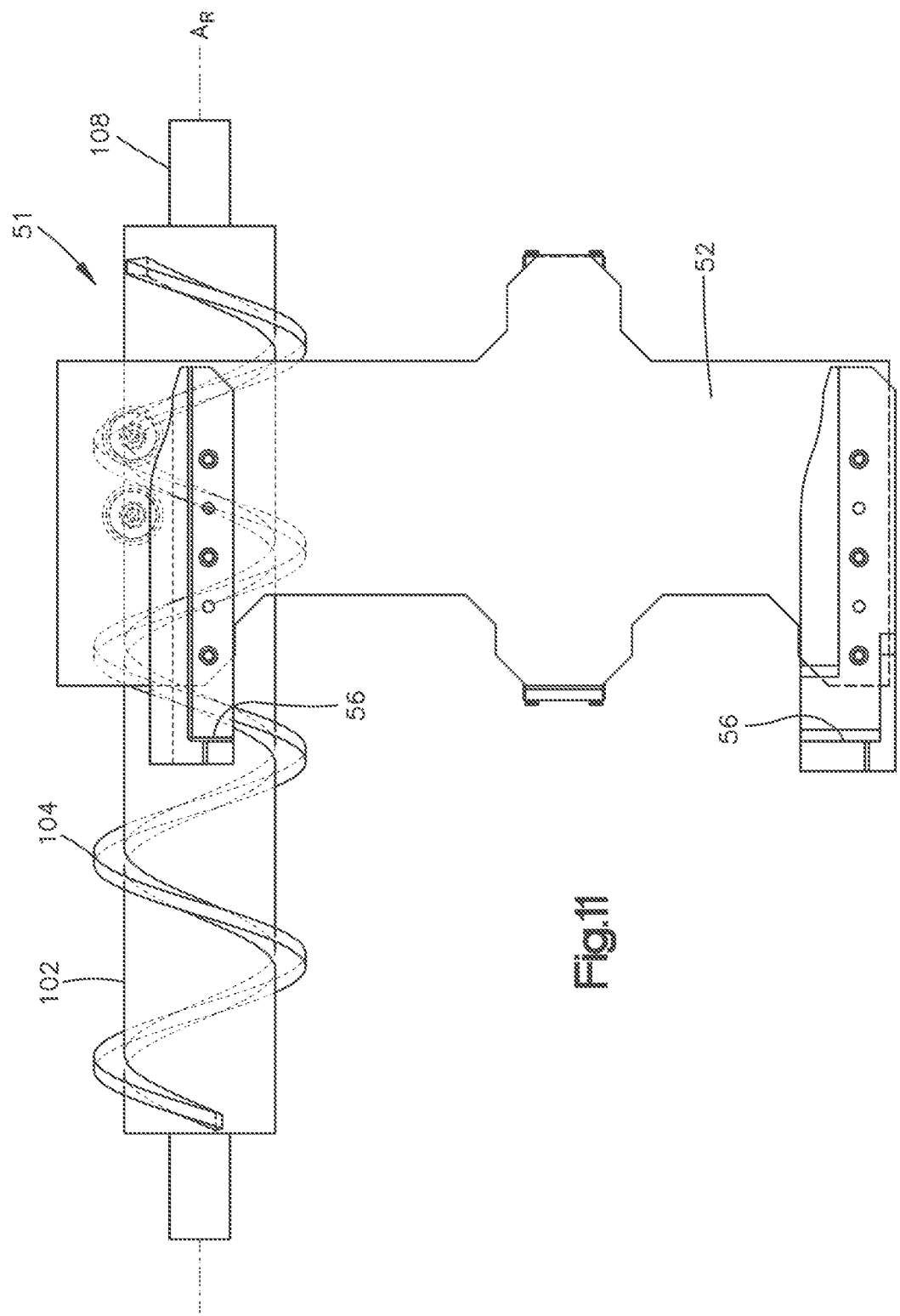

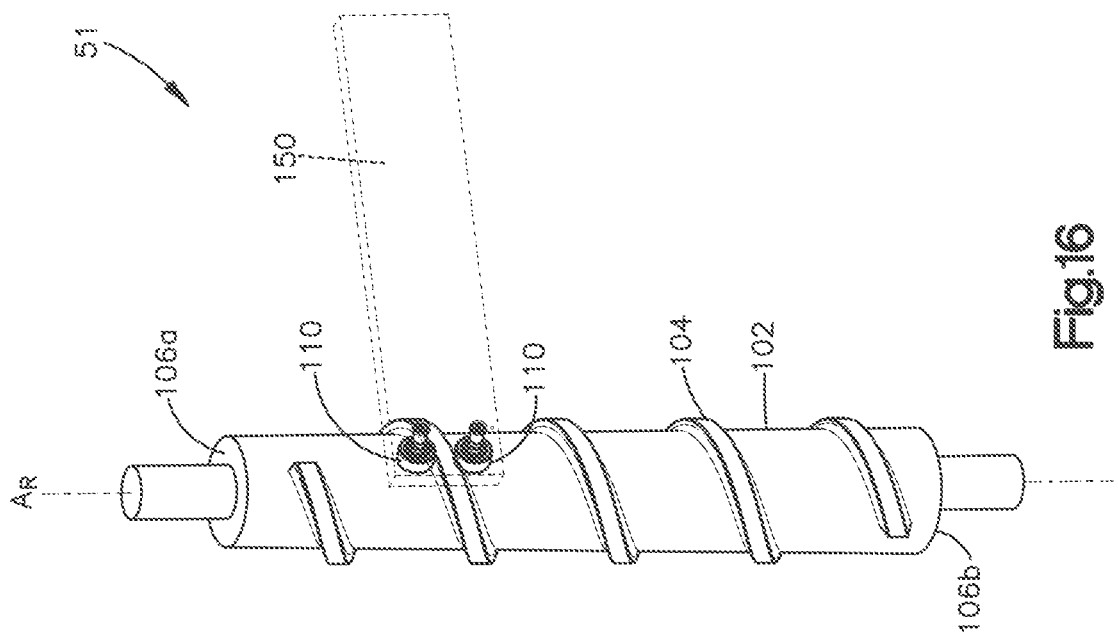
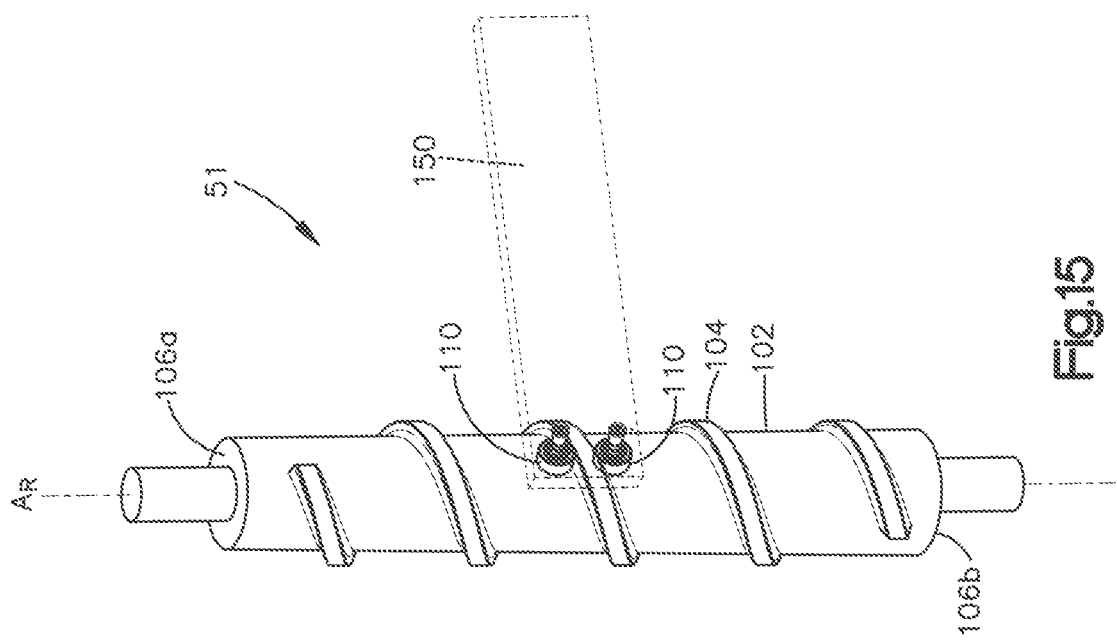

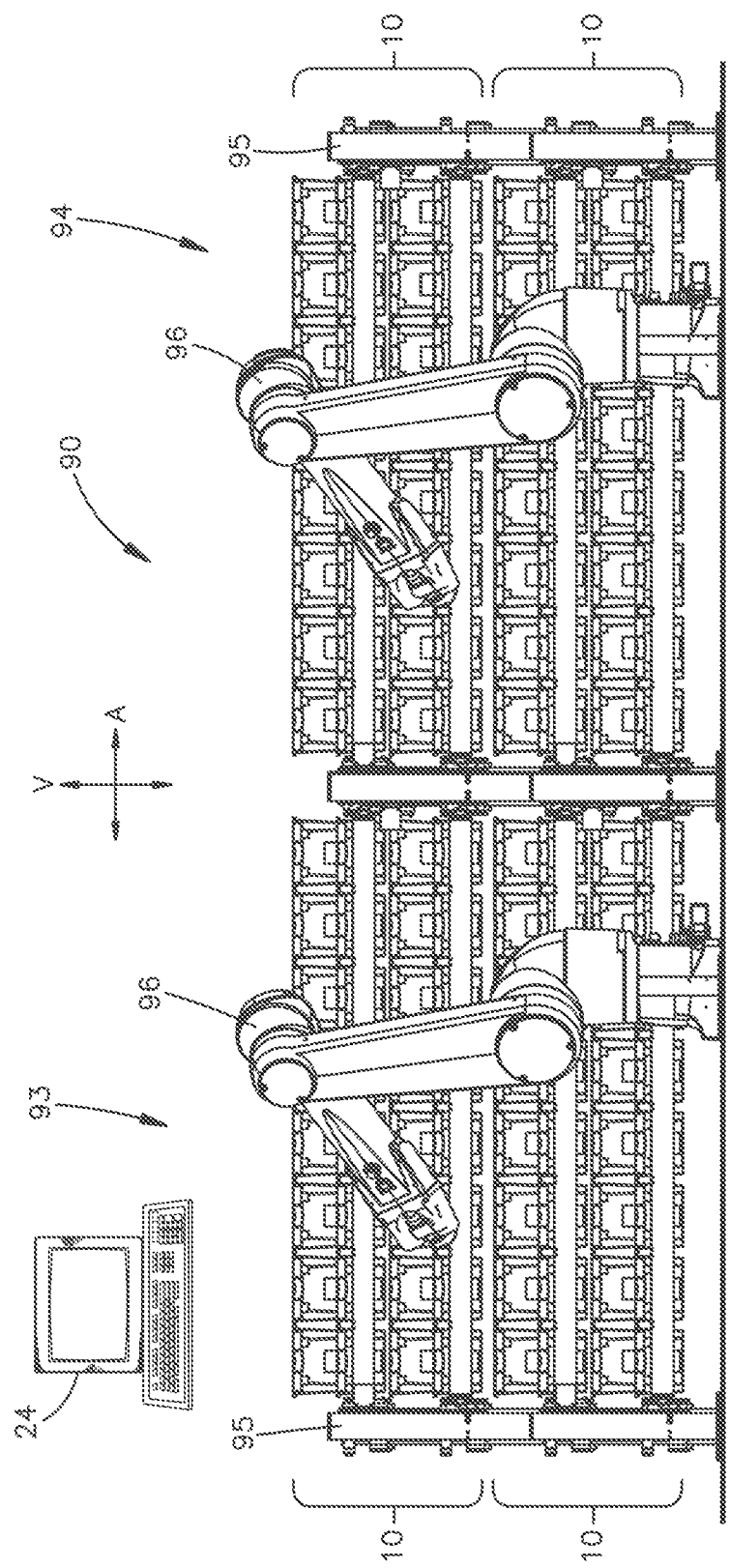

STACKABLE INVENTORY STORAGE MODULE HAVING HELICAL DRIVE

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, a human can carry the inventory item down an aisle in the warehouse to the desired shelving unit and place the inventory item on the desired shelving unit where it is stored until it is needed. When an order is placed, a human can travel down the aisle to the desired shelving unit, retrieve the inventory item from the desired shelving unit, and place the inventory item on a conveyor belt that carries the inventory item downstream for packaging and shipping. There are some systems in which containers are oriented in rows, and the entire row moves up or down vertically under the control of an operator.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3 shows a perspective view of one of the container carriers of FIG. 1 according to one example embodiment;

FIG. 4 shows a perspective view of the container carrier of FIG. 3 supporting a plurality of inventory storage containers;

FIG. 5 shows a side view of one corner of the storage module of FIG. 1 according to one embodiment that includes a movement system in a first position and a vertical lift in a lowered position and showing a portion of the container carriers;

FIG. 6 shows a side view of the corner of FIG. 5 with the movement system in the first position and the vertical lift in a raised position;

FIG. 8 shows a side view of the corner of FIG. 5 with the movement system in a second position and the vertical lift in the lowered position;

FIG. 9 shows a perspective view of an actuator of the storage module of FIG. 1 according to one example embodiment;

FIG. 10 shows a side view of the actuator of FIG. 9;

FIG. 11 shows a side view of the actuator of FIGS. 9 and 10 coupled to a catch of the storage module of FIG. 1;

FIG. 15 shows an example load attached to the actuator of FIG. 9, where the load is moved to a third position along the roller; and FIG. 16 shows an example load attached to the actuator of FIG. 9, where the load is moved to a fourth position along the roller; and FIG. 17 shows an end view of a storage system according to one example embodiment that comprises a plurality of instances of the storage module of FIG. 1.

DETAILED DESCRIPTION

In inventory storage facilities, storage density is an important characteristic. Packing inventory items closer together reduces the overall volume that is needed to store the inventory items. Thus, a smaller building or structure can be used to store inventory items that are packed closer together. Alternatively, in an existing storage facility, increasing density can free up warehouse space that can be used to store additional inventory items, thereby increasing the capacity of the storage facility. Presented herein are inventory storage modules and storage systems that can have a higher storage density than the conventional shelving units discussed above.

Examples described herein are directed to devices, systems, and techniques for managing item storage and retrieval using stackable storage modules. In particular, the examples described herein may enable high-density storage systems including automated item storage and retrieval, with little to no human assistance. Such storage systems may be achieved by using an item movement management system (e.g., a set of computing devices) that coordinates the actions of automated material handling equipment, including stackable storage modules. The storage modules in their various forms described herein may enable improved item storage and retrieval as compared to conventional storage techniques. For example, the storage modules may enable improved storage density, decreased time needed for storage and retrieval of items, and fewer lost items. These improvements, along with others, may result in increased system throughput, decreased capital expenses for new storage facilities, and decreased overall operating costs.

Figure 1:
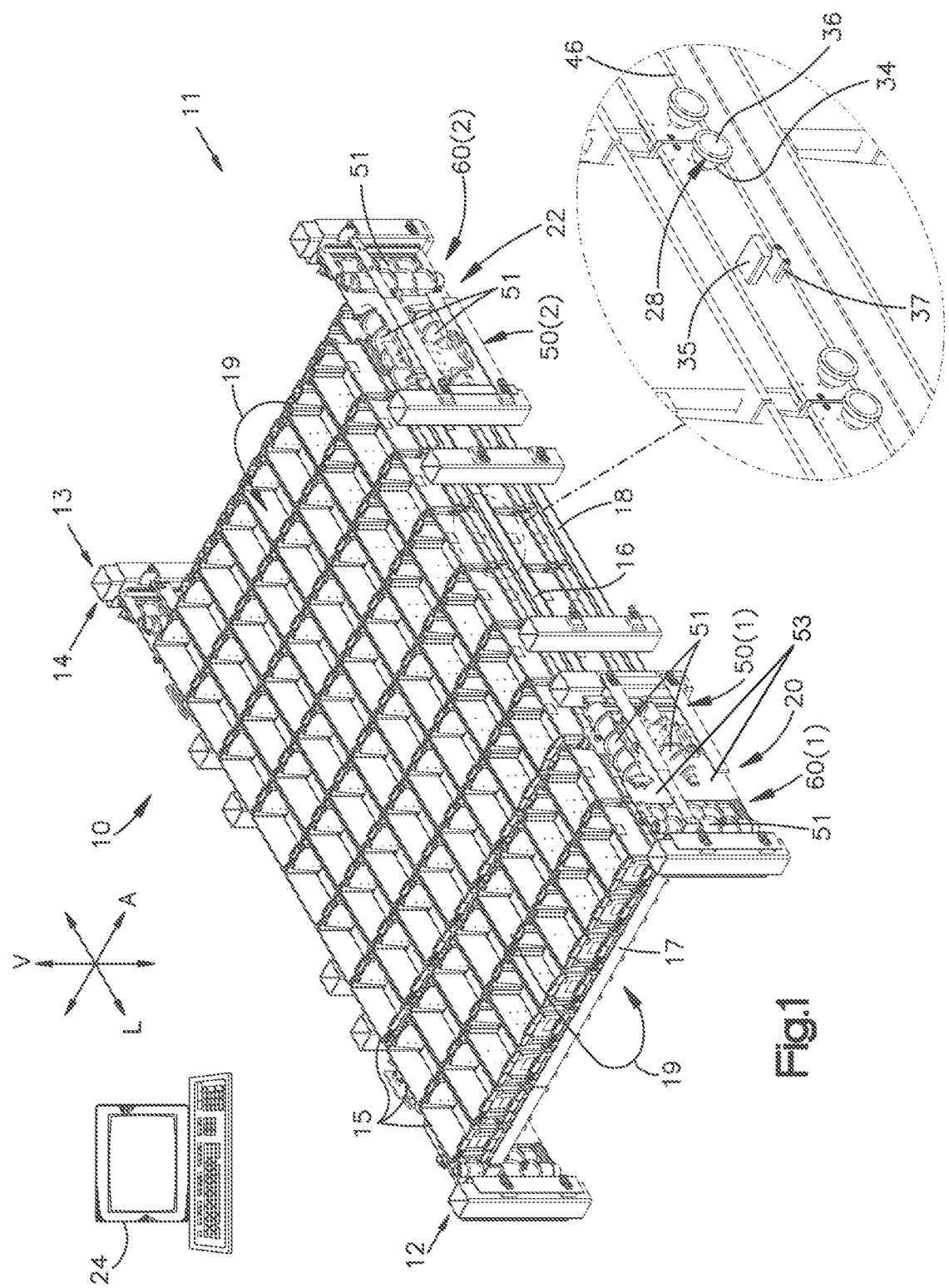
FIG. 1 shows a perspective view of a storage module according to a first example embodiment having a plurality of container carriers, each supporting a plurality of inventory storage containers.
Figure 2:
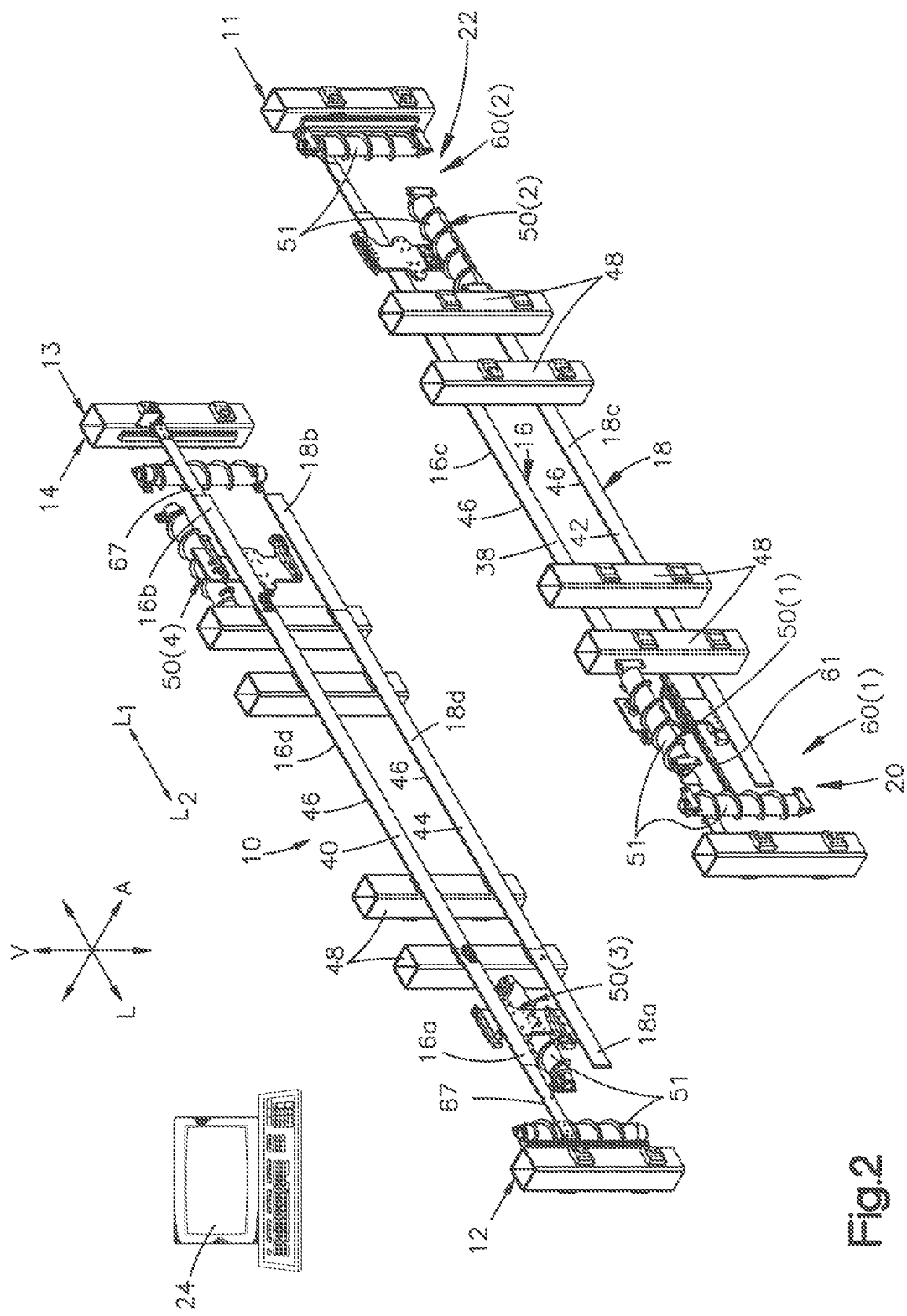
FIG. 2 shows a perspective view of the storage module of FIG. 1 without the container carriers or the inventory storage containers.

Referring generally to FIGS. 1 and 2, an inventory storage module 10 is shown that is configured to store inventory items. In general, the inventory storage module 10 has a first module end 12 and a second module end 14 spaced from one another along a longitudinal direction L. The storage module 10 also has a first module side 11 and a second module side 13 spaced from one another along a lateral direction A, perpendicular to the longitudinal direction L. The longitudinal direction L can be a first horizontal direction, and the lateral direction A can be a second horizontal direction.

The storage module 10 is elongate from its first module end 12 to its second module end 14 along the longitudinal direction L. For example, the storage module 10 has a module length along the longitudinal direction L from its first module end 12 to its second module end 14 that is greater than a module width of the storage module from its first module side 11 to its second module side 13 along the lateral direction A. The module length can also be greater than a module height along a vertical direction V, perpendicular to both the longitudinal direction L and the lateral direction A. The overall dimensions (e.g., module length, module width, and module height) of the storage module 10 may be selected to optimize storage density of the stackable storage module or other suitable parameter. For example, the dimensions may be selected to fit within a particular structure (e.g., a shipping container or warehouse).

The storage module 10 has a plurality of conveyor segments that define a movement path 19. The movement path 19 can have a closed shape, such as a rectangle, a loop, an oval, or any other suitable closed shape. For example, the storage module 10 has a first conveyor segment 16 and a second conveyor segment 18 that extend along the longitudinal direction L. The storage module 10 also has a third conveyor segment 20 adjacent the first module end 12 and a fourth conveyor segment 22 adjacent the second module end 14. The first and second conveyor segments 16 and 18 are configured to carry inventory storage containers 15 along the longitudinal direction L between the third and fourth conveyor segments 20 and 22. Thus, the first and second conveyor segments 16 and 18 can be considered to be longitudinal conveyor segments. Moreover, the storage module 10 can include at least one movement system 50(1) to 50(4) that is configured to move the storage containers 15 along the first and second conveyor segments 20 and 22. The third and fourth conveyor segments 20 and 22 are configured to carry inventory storage containers 15 between the first and second conveyor segments 16 and 18. For example, the third and fourth conveyor segments 20 and 22 can be implemented as first and second vertical lifts 60(1) and 60(2), respectively, that move the storage containers 15 vertically between the first and second conveyor segments 16 and 18.

The conveyor segments 16, 18, 20, and 22 together define the movement path 19. The movement path 19 can be elongate along the longitudinal direction L. The movement path 19 can have a length along the longitudinal direction L that is greater than a height of the movement path along the vertical direction V. The movement path 19 can be considered to be a closed movement path in that the conveyor segments 16, 18, 20, and 22 transfer storage containers 15 only around the movement path 19, without the conveyor segments 16, 18, 20, and 22 transferring storage containers 15 outside of the movement path 19 and without the conveyor segments 16, 18, 20, and 22 transferring storage containers 15 into the movement path 19. However, it will be understood that the storage containers 15 can be removed from, and placed back into, the movement path 19 by a person or machine such as a robotic arm.

The first and second longitudinal conveyor segments 16 and 18 can be offset from one another along the vertical direction V as shown. Thus, the first and second longitudinal conveyor segments 16 and 18 can be considered to be upper and lower conveyor segments, respectively. In such embodiments, the movement path 19 can be defined in a plane that extends along the vertical direction V and the longitudinal direction L. Thus, the module height can be defined from the first longitudinal conveyor segment 16 to the second longitudinal conveyor segment 18. In alternative embodiments (not shown), the first and second longitudinal conveyor segments 16 and 18 can be offset from one another along the lateral direction A. In such embodiments, the movement path 19 can be defined in a plane that extends along the longitudinal direction L and the lateral direction A (i.e., a horizontal plane).

The storage module 10 can comprise at least one actuator 51 that is configured to move the inventory storage containers 15 along the movement path 19, such as along one of the first to fourth conveyor segments 16, 18, 20, and 22. For example, each actuator 51 can be configured to move the storage containers 15 along a linear direction such as the longitudinal direction L or the vertical direction V. Each actuator 51 can be supported relative to the conveyor segments 16, 18, 20, and 22 by brackets 53. Each actuator 51 can be implemented as part of one of the movement systems 50(1) to 50(4) or vertical lifts 60(1) and 60(2). In some embodiments, each movement system 50(1) to 50(4) can include an actuator 51. Further, in some embodiments, each vertical lift 60(1) and 60(2) can include at least one actuator 51, such as a pair of actuators 51. At least one, up to all, of the actuators 51 is implemented as shown in FIGS. 9 and 10. It will be understood that, in alternative embodiments, one or more of the actuators 51 can be implemented as shown in FIGS. 9 and 10, and one or more of the actuators 51 can be implemented as any other suitable linear actuator, such as (without limitation) a motor driven actuator, a pneumatic actuator, a hydraulic actuator, or any of the actuators shown in PCT patent application no. PCT/US2018/013920, filed Jan. 16, 2018, the teachings of which are hereby incorporated by reference as if set forth in their entirety herein. For example, one such alternative embodiment, the vertical lifts 60(1) and 60(2) can each include at least one actuator 51 of FIGS. 9 and 10, while the movement systems 50(1) to 50(4) can each implement another suitable linear actuator.

The at least one actuator 51 can be configured to move the storage containers 15 along the movement path 19 until a desired one of the storage containers 15 is presented at one of the first module end 12 and the second module end 14. Thus, the at least one actuator 51 and the conveyor segments 16, 18, 20, and 22 can operate together to translate the storage containers 15 around the movement path 19 until a desired one of the storage containers 15 is presented at one of the first module end 12 and the second module end 14. At such position, the desired storage container 15 can be accessed by a person, or machine such as a robotic arm, so that an inventory item can then be placed onto the desired storage container 15 for storage or can be removed from the desired storage container 15 to fulfill a customer order or for further transporting or processing. Additionally or alternatively, the person or machine can remove storage containers 15 from the storage module and place storage containers 15 onto the storage module.

The storage module 10 can operate in a unidirectional manner such that the storage containers 15 can be moved in only a first direction (that is, clockwise or counterclockwise) around the movement path. Alternatively, the storage module 10 can operate in a bidirectional manner such the storage containers 15 can be selectively rotated in one of the first direction and a second direction, opposite the first direction. The movement and positioning of storage containers 15 can be controlled by a controller 24, which can be in wired or wireless communication with the segments of the storage module. The controller 24 can control the speed and optionally the direction in which the storage containers are translated. Further, the controller 24 can stop translation of the storage containers when a desired storage container is presented at one of the first and second ends 12 and 14.

In some embodiments, as shown in FIG. 1, the storage module 10 can include a plurality of container carriers 17 (shown in further detail in FIGS. 3 and 4), where each container carrier 17 is configured to support at least one, such as a plurality, of the inventory storage containers 15. Thus, the storage module 10 can be configured to transfer the container carriers 17 around the movement path 19. In such embodiments, the conveyor segments 16, 18, 20, and 22 can be configured to carry the container carriers 17 around the movement path 19 until a desired one of the container carriers 17 is presented at one of the first and second module ends 12 and 14. Thus, the first and second conveyor segments 16 and 18 can be configured to carry the carriers 17 along the longitudinal direction L, and the third and fourth conveyor segments 20 and 22 can be configured to carry container carriers 17 between the first and second conveyor segments 16 and 18. The storage module 10 can be configured such that, when the third and fourth conveyor segments 20 and 22 transfer container carriers 17, at least some, up to all, of the container carriers 17 on the upper and lower conveyor segments 16 and 18 remain stationary. The storage module 10 can be configured such that, when the container carriers 17 are moved along the upper and lower conveyor segments 16 and 18, the third and fourth conveyor segments 20 and 22 do not move any container carriers 17.

Referring to FIGS. 9 and 10, an actuator 51 according to one example embodiment will now be described. The actuator 51 comprises a roller 102 and a helical track 104 disposed around the roller 102 in a helical pattern. The helical pattern can be similar to that of a thread on a screw. The actuator 51 can further comprise at least one track follower 110 configured to ride along the helical track 104 when the roller is rotated about a central axis $A_R$. The roller 102 can be a conveyor roller used in conveyor systems. The roller 102 has a cylindrical body 106 that extends along a central axis $A_R$. The cylindrical body 106 has a first end 106a and a second end 106b that are offset from one another along the central axis $A_R$. The cylindrical body 106 has a cylindrical outer surface 106c that extends from the first end 106a to the second end 106b. In some embodiments, the cylindrical body 106 can define a cylindrical shell having the cylindrical outer surface 106c and an interior cavity within the cylindrical shell.

The roller 102 has at least one shaft 108 that extends outwardly from the first and second ends 106a and 106b of the roller 102 along the central axis $A_R$. The at least one shaft 108 can be a single shaft or can be two separate shafts extending from either end of the cylindrical body 106. The at least one shaft 108 has a first shaft end 108a and a second shaft end 108b that are offset from one another along the central axis $A_R$. The actuator 51 comprises a motor that is configured to rotate the cylindrical outer surface 106c about the central axis $A_R$. The motor can be disposed within the roller 102 as will be described in further detail below in regards to FIG. 12 so as to rotate the cylindrical outer surface 106c when a position of at least one of the first and second shaft ends 108a and 108b of the at least one shaft 108 is fixed. Alternatively, the motor can be disposed outside of the roller 102 and can be configured to rotate the shaft 108, which in turn rotates the cylindrical outer surface 106c. For example, the at least one shaft 108 of the roller 102 can be a drive shaft of the motor. As another example, the drive shaft of the motor and the at least one shaft 108 can be coupled together by a belt, chain, gear, or other mechanical device such that rotation of the drive shaft in turn drives rotation of the at least one shaft 108.

The helical track 104 extends around the curved outer surface 106c in the helical pattern. The helical track 104 can be welded to, otherwise attached to, or formed integrally with, the cylindrical outer surface 106c. The helical track 104 is rotationally fixed with respect to the cylindrical outer surface 106c such that rotation of the cylindrical outer surface 106c causes rotation of the helical track 104. The helical track 104 has at least one guide surface that is configured to guide the at least one track follower 110 along a helical path around the actuator 51 as the roller 102 is rotated. In at least some embodiments, the at least one guide surface can include first and second guide surfaces 104a and 104b that are opposite from one another. The first and second guide surfaces 104a and 104b can be configured to guide first and second track followers 110, respectively, along the helical path around the actuator 51. The helical track 104 can have an outer edge 104c that is spaced from the cylindrical outer surface 106c and that defines a crest of the helical track 104. Each of the at least one guide surface 104a and 104b can extend from the cylindrical outer surface 106c to the outer edge 104c.

Figure 12:
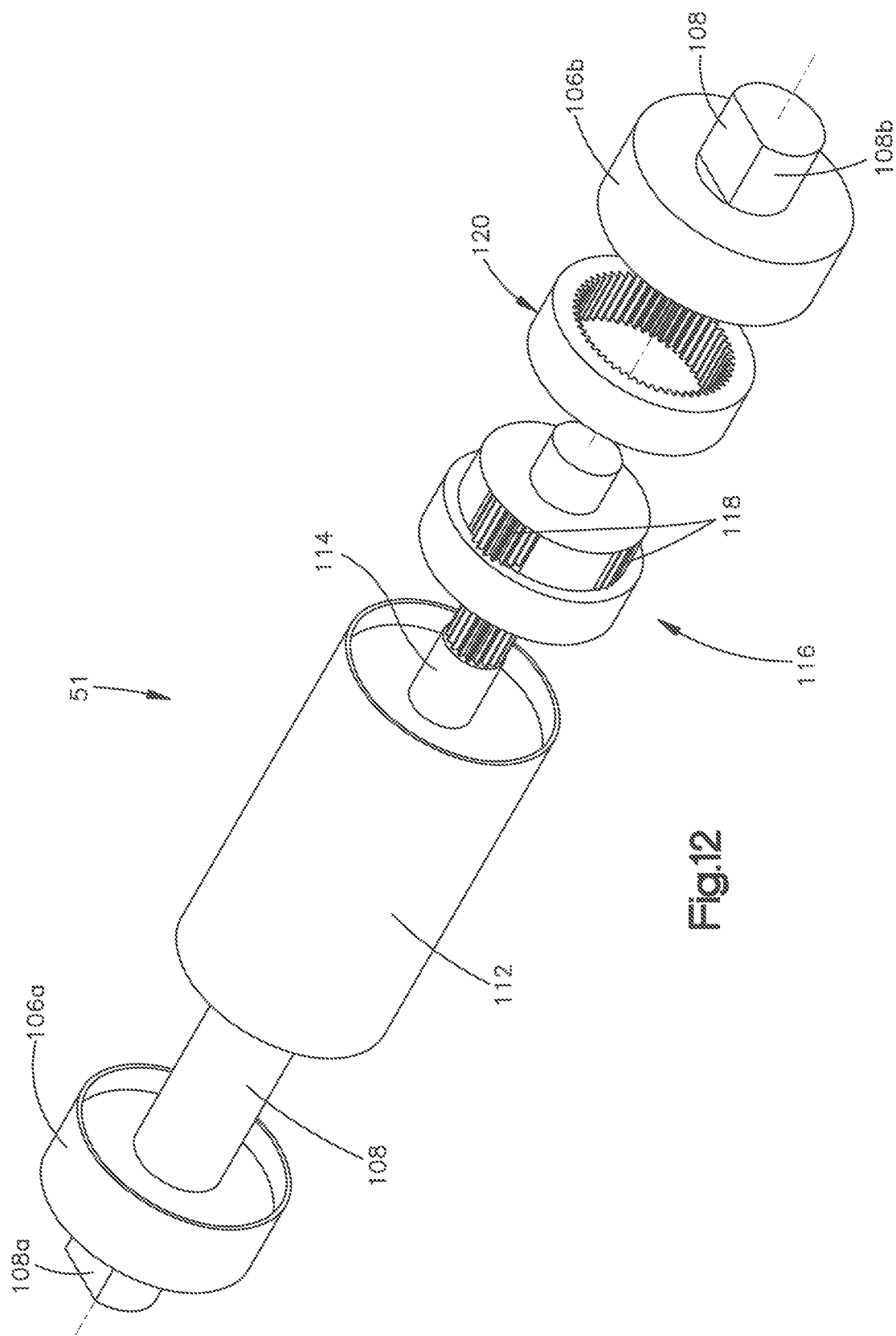
FIG. 12 shows an exploded view of a drive roller according to one example embodiment that can be used to implement the actuator of FIG. 9.
Figure 14:
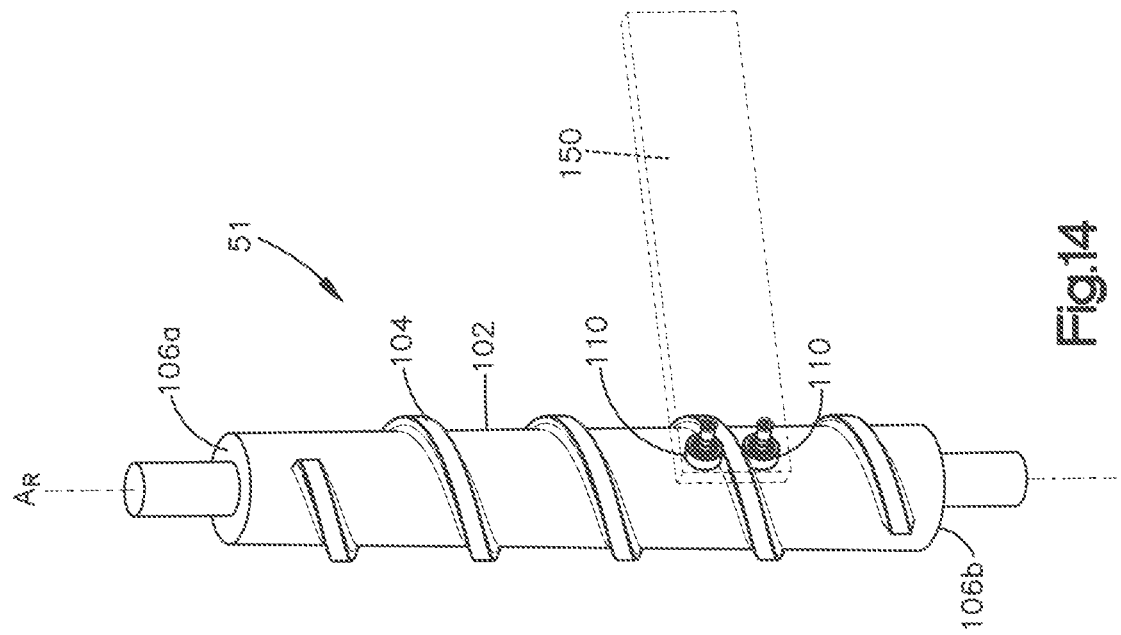
FIG. 14 shows an example load attached to the actuator of FIG. 9, where the load is moved to a second position along the roller.

Turning briefly to FIG. 12, one example embodiment of the roller 102 is shown with the cylindrical outer surface 106c and helical track 104 removed. The roller 102 comprises an internal motor 112 that is disposed between the first and second ends 106a and 106b of the roller 102. For instance, the motor 112 is disposed within an interior cavity of the cylindrical body 106. Thus, the motor 112 can be positioned radially inward from the cylindrical outer surface 106c. In some embodiments, the roller 102 can be a conveyor roller having an internal motor such as the roller drives manufactured by Interroll Corporation, or similar roller drives manufactured by other manufactures, where the roller drive is modified to include the helical track 104.

The roller 102 can comprise a drive shaft 114 that is coupled to the motor 112. The motor 112 can be configured to rotate the drive shaft 114 about the central axis $A_R$. The roller 102 can comprise an internal gearing 116 that is connected between the drive shaft 114 and the cylindrical outer surface 106c. The drive shaft 114 can be configured to drive the internal gearing 116. The internal gearing 116 can be configured to convert the rotational motion of the drive shaft 114 to rotational motion of the cylindrical outer surface 106c. In one example, the internal gearing 116 can be a planetary gear having a plurality of planet gears 118 and a ring gear 120. Each planet gear 118 can have a cylindrical shape with external teeth disposed about the curved outer surface of the cylinder. Further, each planet gear 118 can have its own central axis $A_P$. The ring gear 120 can have a ring shape with internal teeth disposed about an inner surface of the ring. The ring gear 120 can have a central axis that is aligned with the central axis $A_R$ of the roller 102.

The drive shaft 114 can be configured to rotate each of the planet gears 118 about their respective axes $A_P$. The planet gears 118 can be configured to rotate the ring gear 120 about the central axis $A_R$. The external teeth of each planet gar 118 engages the internal teeth of the ring gear 120. The ring gear 120 can be rotationally fixed with respect to the cylindrical outer surface 106c. Thus, rotation of the ring gear 120 can cause the cylindrical outer surface 106c to rotate about the central axis $A_R$. At least one, such as both, of the ends 108a and 108b of the at least one shaft 108 can be rotationally fixed relative to the cylindrical outer surface 106c.

Referring back to FIGS. 9 and 10, each track follower 110 can be configured as a cam follower, wheel assembly, or other suitable rolling mechanism. Each track follower 110 can comprise a track roller 110b that is configured to rotate about a central axis $A_{TF}$. Each track roller 110b can be configured as, for example, a wheel or a bearing, that is configured to roll along the at least one guide surface. Each track follower 110 can further include a shaft 110a that extends along the central axis $A_{TF}$. Each track roller 110b can be rotatably coupled to a respective one of the shafts 110a such that the track roller 110b can rotate relative to the shaft 110a. Each shaft 110a can be configured to attach a respective one of the track rollers 110b to a load so as to translate the load linearly along an axial direction $D_A$ that is substantially parallel to the central axis $A_R$ when the roller 102 rotates. The load can include a carrier engagement surface that is configured to engage a container carrier 17 so as to move the container carrier 17.

In some embodiments, as shown in FIGS. 9 and 10, the actuator 51 can include first and second track followers 110. The first and second track followers 110 can be positioned on either side of the helical track 104. Thus, the track 104 can be disposed between the first and second track followers 110. In such manner, the first and second track followers 110 can ride along the first and second guide surfaces 104a and 104b, of the track 104, respectively, as the helical track 104 is rotated about the central axis $A_R$.

Turning to FIGS. 13 to 16, an example method of moving a load 150 between the first and second ends 106a and 106b of the roller 102 is shown. In this example, the load 150 is a track 66 of one of the vertical lifts 60(1) and 60(2). However, it will be understood that the load 150 can take any other suitable form. For example, the load 150 can be a catch 52 of one of the movement systems 50(1)-50(4) as shown in FIG. 11. In FIGS. 13-16, the load 150 is shown as transparent so that the track followers 110 can be seen.

In operation, the first and second shaft ends 108a and 108b are fixed such that at least one or both of the first and second shaft ends 108a and 108b do not rotate about the axis $A_R$. The motor of the roller 102 drives the cylindrical outer surface 106c to rotate about the axis $A_R$, thereby causing the helical track 104 to rotate in one of a first rotational direction (i.e., clockwise or counterclockwise) and a second rotational direction that is opposite the first rotational direction. When the helical track 104 rotates in the first rotational direction, the at least one track follower 110 rides along the at least one guide surface 104a and 104b, causing the at least one track follower 110 to translate linearly along a first axial direction that is parallel to the axis $A_R$, such as towards one of the first and second ends 106a and 106b of the body 106. This in turn causes the load 150 to translate linearly along the first axial direction. For example, when viewing FIGS. 13 to 16 in order, the load 150 is translated towards the first end 106a along a first axial direction.

When the helical track 104 rotates in the second direction, the at least one track follower 110 rides along the at least one guide surface 104a and 104b, causing the at least one track follower 110 to translate linearly along a second axial direction that is opposite the first axial direction, such as towards the other one of the first and second ends 106a and 106b of the body 106. This in turn causes the load 150 to translate linearly along the second axial direction. For example, when viewing FIGS. 13 to 16 in reverse order (i.e., from FIG. 16 to FIG. 13), the load 150 is translated towards the second end 106b along a second axial direction.

The actuator 51 can be used in the vertical orientation shown in which the central axis $A_R$ extends along a vertical direction. Alternatively, the actuator 51 can be used in any other suitable orientation, including (without limitation) a horizontal orientation as shown in FIG. 11 in which the central axis $A_R$ extends along a horizontal direction. The actuator 51 can provide a greater mechanical advantage than other linear actuators that do not employ a threading to move a load. As a result, the actuator 51 can drive a load using a smaller motor and/or smaller gearing than a comparable linear actuator driving the same load. Further, the actuator 51 can drive a greater load than a comparable linear actuator having a comparably sized motor and gearing.

Referring back to FIG. 10, the helical track 104 can have a pitch p. In some example embodiments, the pitch p can be constant from the first end 106a to the second end 106b. In some such example embodiments, the actuator 51 can be configured such that when the cylindrical outer surface 106c is rotated at a constant rotational speed, the at least one track follower 110 moves at a constant rate between the first and second ends 106a and 106b along one of the first and second axial directions. The motor can be implemented as a constant speed motor to rotate the cylindrical outer surface 106c at a constant rotational speed. Additionally or alternatively, the actuator 51 can be configured such that when the cylindrical outer surface 106c is rotated at a variable rotational speed, the at least one track follower 110 moves at a variable rate between the first and second ends 106a and 106b along one of the first and second axial directions. The motor can be implemented as a variable speed motor to rotate the cylindrical outer surface 106c at a variable rotational speed.

In other example embodiments, the pitch p can vary between the first and second ends 106a and 106b. For example, the pitch p can be smaller adjacent one or both of the first and second ends 106a and 106b than it is between the first and second ends 106a and 106b (such as midway between the first and second ends 106a and 106b). In such embodiments, when the cylindrical outer surface 106c is rotated at a constant rotational speed, the at least one track follower 110 moves at a variable rate along one of the first and second axial directions. For example, the rate can be higher when the at least one track follower 110 is between the first and second ends 106a and 106b than it is when the at least one track follower 110 is adjacent to one or both of the first and second ends 106a and 106b. Thus, the rate at which the at least one track follower 110 travels along one of the first and second axial directions can decrease towards one or both of the first and second ends 106a and 106b such that the at least one track follower 110 slows towards one or both of the first and second ends 106a and 106b without causing a change in the rotational speed of the roller 102. Accordingly, such embodiments can be implemented with a constant speed motor.

Referring back to FIGS. 1 and 2, the storage module 10 will now be described in further detail. The first and second conveyor segments 16 and 18 extend between the first module end 12 and the second module end 14, and between the first module side 11 and the second module side 13. The first and second conveyor segments 16 and 18 are each elongate along the longitudinal direction L. For example, each of the first and second conveyor segments 16 and 18 has a segment length along the longitudinal direction L and a segment width along the lateral direction A, where the segment length is greater than the segment width. Each of the longitudinal conveyor segments 16 and 18 can include a conveyor surface, and the storage module can be configured to transfer storage containers 15 along the conveyor surfaces along the longitudinal direction L. The conveyor surfaces can be defined by conveyor elements such as tracks as described below. However, in alternative embodiments, the conveyor surfaces can be defined by belts, rollers, skate wheels, balls, any other suitable conveyor element for translating the storage containers 15, or any suitable combination of conveyor elements.

The first conveyor segment 16 has a first segment end 16a, and a second segment end 16b that is offset from the first segment end 16a along the longitudinal direction L. The first and second segment ends 16a and 16b can be terminal free ends that are free from a fixed connection to another track. The first conveyor segment 16 is elongate from the first segment end 16a to the second segment end 16b. The first conveyor segment 16 has a first lateral side 16c and a second lateral side 16d spaced from the first lateral side 16c along the lateral direction A, perpendicular to the longitudinal direction L. The first conveyor segment 16 further has at least a one conveyor surface 46 (herein referred to as a first conveyor surface) that extends between the first and second segment ends 16a and 16b. For example, the first conveyor segment 16 can include a first upper track 38 and a second upper track 40 offset from one another along the lateral direction A by a track width $W_T$. The upper tracks 38 and 40 can each include an upper surface 46 that is configured to support wheels of the container carriers 17.

The first conveyor segment 16 is configured to carry container carriers 17, and hence storage containers 15, along the first conveyor surface 46 from the first terminal free end 16a to the second terminal free end 16b along a first longitudinal direction $L_1$ when the conveyor segments operate in a clockwise direction as viewed. Additionally or alternatively, the first conveyor segment 16 can be configured to carry container carriers 17 along the conveyor surface 46 from the second end 16b to the first end 16a along a second longitudinal direction $L_2$, opposite the first longitudinal direction $L_1$, when the conveyor segments operate in a counterclockwise direction as viewed.

Similarly, the second conveyor segment 18 has a first segment end 18a, and a second segment end 18b that is offset from the first segment end 18a along the longitudinal direction L. The first and second segment ends 16a and 16b can be terminal free ends that are free from a fixed connection to another track. The second conveyor segment 18 is elongate from the first segment end 18a to the second segment end 18b. The second conveyor segment 18 has a first lateral side 18c and a second lateral side 18d spaced from the first lateral side 18c along the lateral direction A. The second conveyor segment 18 further has at least one conveyor surface 46 (herein referred to as a second conveyor surface) that extends between the first and second segment ends 18a and 18b. For example, the second conveyor segment 18 can include a first lower track 42 and a second lower track 44 offset from one another along the lateral direction A by the track width $W_T$. The lower tracks 42 and 44 can each include an upper surface 46 that is configured to support wheels of the container carriers 17.

The second conveyor segment 18 is configured carry container carriers 17, and hence storage containers 15, along the second conveyor surface 18e from the second end 18b to the first end 18a along the second longitudinal direction $L_2$ when the conveyor segments operate in a clockwise direction as viewed. Additionally or alternatively, the second conveyor segment 18 can be configured to carry container carriers 17 along the second conveyor surface 46 from the first end 18a to the second end 18b along the first longitudinal direction $L_1$ when the conveyor segments operate in a counterclockwise direction as viewed. The second conveyor segment 18 is offset from the first conveyor segment 16 along the vertical direction V.

The storage module 10 can include one or more supports that couple the first and second conveyor segments 16 and 18 to one another. For instance, the storage module 10 can include one or more supports, such as one or more posts 48, that are coupled to the first upper track 38 and the first lower track 42 so as to position the first upper track 38 above the first lower track 42. Similarly, the storage module 10 can include one or more supports, such as one or more posts 48, that are coupled to the second upper track 40 and the second lower track 44 so as to position the second upper track 40 above the second lower track 44. The storage module 10 can optionally include one or more supports (not shown) that couple the first upper track 38 to the second upper track 40 so as to space the first and second upper tracks 38 and 40 from one another along the lateral direction A, and one or more supports (not shown) that couple the first lower track 42 to the second lower track 44 so as to space the first and second lower tracks 42 and 44 from one another along the lateral direction A.

The third and fourth conveyor segments 20 and 22 are configured to transfer storage containers 15 between the first and second conveyor segments 16 and 18. Thus, the third and fourth conveyor segments 20 and 22 can be considered to be connecting conveyor segments. The third and fourth conveyor segments 20 and 22 are offset from one another along the longitudinal direction L. Each of the third and fourth conveyor segments 20 and 22 are configured to transfer storage containers 15 between the first and second conveyor segments 16 and 18. For example, each of the third and fourth conveyor segments 20 and 22 can be configured to convey storage containers 15 along the vertical direction V from one of the first and second conveyor segments 16 and 18 to the other one of the first and second conveyor segments 16 and 18. In some embodiments as shown in FIG. 1, the third and fourth conveyor segments 20 and 22 can be implemented as first and second vertical lifts 60(1) and 60(2), respectively. Each vertical lift 60(1) and 60(2) can be configured to transfer the storage containers 15 along the vertical direction V between the first and second conveyor segments 16 and 18. Thus, the first and second conveyor segments 16 and 18 can each define a discontinuous conveyor segment, and the vertical lifts can transfer the storage containers 15 between the discontinuous conveyor segments. However, in alternative embodiments, the third and fourth conveyor segments 20 and 22 can include conveyor surfaces such as (without limitation) tracks that connect the first and second conveyor segments 16 and 18. Thus, in such alternative embodiments, the first to fourth conveyor segments 16, 18, 20, and 22 together can define a continuous conveying surface or track.

The first vertical lift 60(1) can be configured to transfer container carriers 17, and hence storage containers 15, between the first end 16a of the first conveyor segment 16 and the first end 18a of the second conveyor segment 18. For instance, the first vertical lift 60(1) can transfer container carriers 17 from the first end 16a of the first conveyor segment 16 to the first end 18a of the second conveyor segment 18 when the storage module 10 operates in the counterclockwise direction, and from the first end 18a of the second conveyor segment 18 to the first end 16a of the first conveyor segment 16 when the storage module 10 operates in the clockwise direction. The first vertical lift 60(1) can be configured to move at least one container carrier 17 at a time. For example, in the embodiment shown, the first vertical lift 60(1) moves only one carrier 17 at a time. The first vertical lift 60(1) is configured to move in a direction opposite the movement path 19 to receive each container carrier 17, and then move the container carrier 17 along the movement path 19. When the first vertical lift 60(1) moves the at least one container carrier between the first and second conveyor segments 16 and 18, at least some, up to all, of the container carriers on the first and second conveyor segments 16 and 18 can remain stationary. In other words, the storage module 10 can be configured such that at least some of the container carriers 17, and hence the storage containers 15, remain stationary while the first vertical lift 60(1) moves at least one container carrier 17 between the first and second conveyor segments 16 and 18.

Similarly, the second vertical lift 60(2) is configured to transfer container carriers 17 between the second end 16b of the first conveyor segment 16 and the second end 18b of the second conveyor segment 18. For instance, the second vertical lift 60(2) can transfer container carriers 17 from the second end 16b of the first conveyor segment 16 to the second end 18b of the second conveyor segment 18 when the storage module 10 operates in the clockwise direction, and from the second end 18b of the second conveyor segment 18 to the second end 16b of the first conveyor segment 16 when the storage module 10 operates in the counterclockwise direction. The second vertical lift 60(2) can be configured to move at least one container carrier 17 at a time. For example, in the embodiment shown, the second vertical lift 60(2) moves only one carrier 17 at a time. The second vertical lift 60(2) is configured to move in a direction opposite the movement path 19 to receive each container carrier 17, and then move the container carrier 17 along the movement path 19. When the second vertical lift 60(2) moves the at least one container carrier between the first and second conveyor segments 16 and 18, at least one, up to all, of the container carriers 17 on the first and second conveyor segments 16 and 18 can remain stationary. In other words, the storage module 10 can be configured such that at least some of the container carriers 17, and hence the storage containers 15, remain stationary while the second vertical lift 60(2) moves at least one container carrier 17 between the first and second conveyor segments 16 and 18.

The storage module 10 can include at least one controller 24 configured to provide at least one control signal to the vertical lifts 60(1) and 60(2) and to at least one movement system 50(1) to 50(4) so as to control the movement of the container carriers 17 around the movement path 19. In some embodiments, the controller 24 can control the speed in which the container carriers 17 are moved. Further, in some embodiments, the controller 24 can control the direction in which the container carriers 17 are moved. Yet further, in some embodiments, the controller 24 can stop the vertical lifts 60(1) and 60(2) and the at least one movement system 50(1) to 50(4) when a desired one of the container carriers 17 is presented at one of the first end 12 and the second end 14.

Referring now to FIGS. 3 and 4, each storage container 15 can be any suitable storage container configured to carry one or more inventory items therein. Preferably, the inventory storage containers 15 are open-top plastic totes configured to carry items in an e-commerce supply chain. The totes are of a size that an individual person or robot can lift. For example, each storage container 15 can be a rectangular structure, such as a bin or tote, formed from a rigid material such as high-density plastic, wood, aluminum, or other suitable material. Each storage container 15 can have a pair of opposed container sidewalls 15a and 15b that are spaced opposite from one another. Each storage container 15 can have a pair of opposed container end walls 15c and 15d that are spaced opposite from one another. The opposed container end walls 115c and 115d can extend between the opposed container sidewalls 15a and 15b. Similarly, the opposed container sidewalls 15a and 15b can extend between the opposed container end walls 15c and 15d.

Each container 15 has a width $W_S$ from one of the sidewalls 15a and 15b to the other one of the sidewalls 15a and 15b, and can have a length $L_S$ from one of the end walls 15c and 15d to the other one of the end walls 15c and 15d. In some embodiments, the length $L_S$ can be greater than the width $W_S$. Each storage container 15 can further have an upper end 15e and a bottom surface 15f spaced from one another along the vertical direction V. The bottom surface 15f can extend between the opposed sidewalls 15a and 15b and between the opposed end walls 15c and 15d. The upper end 15e can be open for ease of access in placing inventory items into, and retrieving inventory items from, the storage container 15. Each container 15 can have a height Hs from the upper end 15e to the bottom surface 15f.

The size of a storage container 15 may be selected to optimize storage density of the stackable storage module or other suitable parameter. This may depend on the size and type of items to be stored in the storage container 15. For example, the storage container 15 may have a height of about 18", a width of about 18", and a length of about 24". However, the dimensions of the storage container 15 can be different than those just recited. The items held by the storage container 15 can be any suitable item stored in a material storage facility including, for example, personal electronic devices, computers, recreational equipment, food products, television sets, clothing, household supplies, automotive parts, books, loaded pallets, and any other suitable object capable of being stored.

The storage containers 15 can be stackable on top of one another. For example, the bottom surface 15f of an upper one of the storage containers 15 can be received in the opening of the upper end 15e of a lower one of the storage containers 15. The upper end 15e of the lower storage container 15 can be configured to support the bottom surface 15f of the upper storage container 15 such that the bottom surface 15f of the upper storage container 15 nests inside the opening of the lower storage container 15. Each container 15 can also include at least one protrusion 15g, each extending outwardly from at least one of the container sidewalls and end walls. For example, each container 15 can include a plurality of protrusions 15g, each extending outwardly from at least one of the sidewalls and end walls at a corner of the container 15 adjacent the upper end 15e. The protrusions 15g can define an upper rim around the upper end 15e of the storage container 15. At least one protrusion 15g can define a handle that is configured to be configured to be engaged by a human hand for carrying. At least one protrusion 15g can include a lower surface that is configured to be engaged by a prong of an end effector of a robotic arm (not shown), fork lift, or other lifting machine. For example, a storage container 15 can include a pair of the protrusions 15g disposed on opposite sides or ends of the container 15 that are configured to be engaged by a pair of prongs.

Each storage container 15 may include an identifier (e.g., bar code, QR code, radio-frequency identification (RFID) tag, and any other suitable identifier). The identifier may be used to uniquely identify the storage container 15. In some examples, the identifier may include non-volatile data storage, which may be associated with the storage container 15 and/or its contents. Data can be read/written to the data storage each time the stackable storage module is accessed. This data may contain status of the stackable storage module, inventory stowed in the stackable storage module, and/or destination information for each storage container 15. In this manner, inventory information may be updated when the identifiers are read.

With continued reference to FIGS. 3 and 4, each container carrier 17 can have a rectangular or other suitably shaped carrier body 26. The carrier body 26 can have a pair of opposed carrier sides 26a and 26b that are spaced opposite from one another along the lateral direction A. The carrier body 26 can have a pair of opposed carrier ends 26c and 26d that are spaced opposite from one another along the longitudinal direction L. The opposed carrier ends 26c and 26d can extend between the opposed carrier sides 26a and 26b. Similarly, the opposed carrier sides 26a and 26b can extend between the opposed carrier ends 26c and 26d. The carrier body 26 has a width $W_S$ from one of the carrier sides 26a and 26b to the other one of the carrier sides 26a and 26b, and has a length $L_S$ from one of the carrier ends 26c and 26d to the other one of the carrier ends 26c and 26d.

Each container carrier 17 can include at least one conveyor-segment engagement feature that is configured to engage the conveyor segments 16, 18, 20, and 22 so that the container carrier 17 can be translated around the movement path 19. Each of the at least one conveyor-segment engagement feature can be disposed at one of the carrier sides 26a or 26b or can be disposed at another location of the container carrier 17. In some embodiments, the at least one conveyor-segment engagement feature can include at least one wheel assembly 28, such as a plurality of wheel assemblies 28. However, it will be understood that, in alternative embodiments, the at least one conveyor segment engagement feature can include a feature other than a wheel assembly. For example, each conveyor-segment engagement feature can be a rod or pin that engages a bearing or chain of tracks of the conveyor segments 16, 18, 20, and 22.

Each wheel assembly 28 can include a wheel 34 that rotates about an axis that extends along the lateral direction A. The container carriers 17 can be configured such that their respective wheels 34 roll along the upper track surfaces 46 of the conveyor segments. Each wheel assembly 28 can include a flange 36 that is outwardly spaced from the wheel 34 along the lateral direction A. Each wheel 34 can have a wheel diameter along a select direction that is perpendicular its rotational axis, and each flange 36 can have an outer dimension along the select direction that is greater than the wheel diameter. Each flange 36 can be configured to ride along an outer side of the upper and lower tracks so as to prevent its respective wheel 34 from riding off of the tracks. Each wheel assembly can additionally or alternatively include an inward flange (not shown) that is configured in a manner similar to that described above but is inwardly spaced from the wheel 34 along the lateral direction A. Each inward flange can be configured to ride along an inner side of the upper and lower tracks so as to prevent its respective wheel 34 from riding off of the tracks.

The wheel assemblies 28 of each container carrier 17 can include a first wheel assembly 28 at a first carrier side 26a and a second wheel assembly 28 at a second carrier side 26b. The wheels 34 of the first and second wheel assemblies 28 can be spaced from one another along the lateral direction A by the track width $W_T$. Thus, the wheels 34 of the first and second wheel assemblies 28 are spaced from one another such that the wheels 34 ride along tracks of the first to fourth conveyor segments 16, 18, 20, and 22. Each container carrier 17 can optionally include a third wheel assembly 28 at the first carrier side 26a and a fourth wheel assembly at the second carrier side 26b. The third and fourth wheel assemblies 28 can be spaced from the first and second wheel assemblies along the longitudinal direction L. The wheels 34 of the third and fourth wheel assemblies 28 can be spaced from one another along the lateral direction A by the track width $W_T$. Thus, the wheels 34 of the third and fourth wheel assemblies 28 can be spaced from one another such that the wheels 34 ride along tracks of the first to fourth conveyor segments 16, 18, 20, and 22.

Each container carrier 17 can include at least one stop 35. Each stop 35 can be a protrusion that extends outwardly from one of the carrier sides 26a and 26b. For example, each container carrier 17 can include first and second stops 49, wherein the first stop 35 extends from a first carrier side 26a and the second stop 35 extends from a second carrier side 26b. The first and second stops 35 can be offset from one another along the lateral direction A by the track width $W_T$. In other words, the first and second stops 35 can be aligned over the first and second tracks of one of the upper and lower conveyor segments 16 and 18 along the vertical direction V. Thus, each stop 35 can be configured to contact one of the first and second tracks to prevent the container carrier 17 from falling down below the tracks in the event that one or more of the carrier wheel assemblies 28 breaks or separates from the container carrier body 26.

Each container carrier 17 can include at least one engagement feature 37 that is configured to be engaged by a catch 52 (discussed below) to move the container carrier 17 along the upper and lower conveyor segments 16 and 18. Each engagement feature 37 can be a protrusion that extends outwardly from a respective one of the carrier sides 26a and 26b. For example, each container carrier 17 can include first and second engagement features 37, wherein the first engagement feature 37 extends from the first carrier side 26a and the second engagement feature 37 extends from the second carrier side 26b. In alternative embodiments, the engagement feature 37 can be a side or end of a container carrier 17 or another suitable feature such as an opening that receives a protrusion carried by the catch 52.

Each container carrier 17 can include at least one bumper 39, such as a plurality of bumpers 39, each disposed on an outer surface of one of the carrier ends 26c or 26d. The bumpers 39 are configured and positioned to abut adjacent container carriers 17 so as to limit contact between the container bodies 26 of adjacent container carriers 17, or prevent such contact altogether. The bumpers 39 are configured to dampen noise that results from the container carriers 17 colliding with one another as they are moved around the movement path 19. The bumpers 39 can be pieces of a noise dampening material such as rubber, silicone, or other suitable material for dampening noise, and may have any suitable shape. In the embodiment shown, the bumpers 39 are rectangular shaped blocks; however, the bumpers 39 can have other suitable shapes.

In at least some examples, the container carrier 17 also includes an identifier. The identifiers may be used to identify a position of the container carrier 17 (and the storage container 15) with respect to the stackable storage module. In some examples, the stackable storage module (or system in which the stackable storage module is implemented) may include any suitable combination of encoders, RFID readers and antenna, cameras, and/or other sensing devices for identifying and locating the container carriers 17 and/or the storage containers 15.

Each container carrier 17 can be configured to support at least one inventory storage container 15. For example, each container carrier 17 can be configured to support a row of inventory storage containers 15 such that the storage containers 15 are offset from one another along the lateral direction A. In such a case, each carrier body 26 can have a carrier width $W_S$ along the lateral direction A from one of the carrier sides 26a and 26b to the other one of the carrier sides 26a and 26b that is greater than a carrier length $L_S$ along the longitudinal direction L from one of the carrier ends 26c and 26d to the other one of the carrier ends 26c and 26d.

The storage containers 15 can be supported in a side-by-side relation such that the opposed sidewalls 15a and 15b of each storage container 15 are spaced from one another along the lateral direction A and at least one sidewall 15a or 15b of each storage container 15 faces a sidewall 15a or 15b of one another one of the storage containers 15 along the lateral direction A. In alternative embodiments (not shown), each container carrier 17 can be configured to support the storage containers 15 in an end-to-end relation such that the opposed end walls 15c and 15d of each storage container 15 are spaced from one another along the lateral direction A and at least one end wall 15c or 15d of each storage container 15 faces an end wall 15c or 15d of one another one of the storage containers 15 along the lateral direction A. Each container carrier 17 can also be configured to support the storage containers 15 in a stacked relation, such that each of one or more containers 15 of the first row has a container stacked thereon. Thus, each container carrier can be configured to support the first row of storage containers 15 and at least a second row of storage containers 15 stacked on the first row.

Each carrier body 26 can include a carrier upper end 26e and a carrier lower end 26f spaced from one another along the vertical direction V. Each carrier body 26 can define a plurality of openings 30 that extend through the upper and lower ends 26e and 26f. Further, each carrier body 26 can include at least one divider 32, such as a plurality of dividers 32. Each divider 32 can extend from one of the carrier ends 26c and 26d to the other along the longitudinal direction L. Each divider 32 can separate adjacent ones of the openings 30. Each opening 30 can be sized to receive a storage container 15 therein. Each opening 30 can be sized such that a lower portion of a corresponding container 15 extends through the opening 30, and the carrier upper end 26e supports an upper portion of the container 15. For example, each opening 30 can have a dimension along a select direction that is greater than a corresponding dimension along the select direction of one of the storage containers 15 at its bottom surface 15f, but less than a dimension along the select direction of the storage container 15 at a location that includes the at least one protrusion 15g. Thus, when a storage container 15 is supported by a container carrier 17, the at least one protrusion 15g of the storage container 15 rests on the container carrier 17, such as on the carrier upper end 26e. For example, the protrusions 15g can define an upper rim around the upper end 15e of the storage container 15, and the upper rim can rest on the container carrier 17. In alternative embodiments, each carrier 17 can be devoid of openings and the containers 15 can rest on a surface of the carrier 17.

The storage containers 15 can be densely packed within each container carrier 17 along the lateral direction A. For example, the storage containers 15 carried by each container carrier 17 can be arranged side-to-side (or end-to-end) such that there is little to no space between adjacent ones of the storage containers 15. In some embodiments, storage containers 15 carried by each container carrier 17 may contact one another other. In other embodiments, the storage containers 15 may be spaced from each other by a distance that is no more than 10 percent of the overall width of each storage container 15 or no more than 5 percent of the overall width of each storage container 15.

The storage containers 15 in the storage module 10 can be densely packed along the vertical direction V. In particular, the storage containers 15 on the upper conveyor segment 16 can be stacked above the storage containers 15 on the lower conveyor segment 18 so that the space between each storage container 15 on the bottom level and the first conveyor segment 16 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers, such as a spacing that is no more than 20 percent of the height of the storage containers, such as no more than 15 percent of the height of the storage containers, such as no more than 10 percent of the height of the storage containers, or such as no more than 5 percent of the height of the storage containers. Storage density is inversely proportional to the distance between a storage container and the conveyor segment 16 immediate over top of the storage container. Thus, as this distance is decreased, the storage density increases.

The storage containers 15 can be supported by the container carriers 17 along the upper and lower conveyor segments 16 and 18 such that the storage containers 15 are densely packed along the upper and lower conveyor segments 16 and 18 along the longitudinal direction L. For example, the container carriers 17 carried by the upper conveyor segment 16 can be arranged end-to-end such that there is little to no space between storage containers 15 of adjacent ones of the container carriers 17. Similarly, the container carriers 17 carried by the lower conveyor segment 18 can be arranged end-to-end such that there is little to no space between storage containers 15 of adjacent ones of the container carriers 17. In some embodiments, container carriers 17 and/or storage containers 15 along each conveyor segment may contact one another other. In other embodiments, the storage containers 15 supported by adjacent container carriers 17 may be spaced from each other by a distance that is no more than 10 percent of the overall length or width of each storage container 15 along the longitudinal direction L or no more than 5 percent of the overall length or width of each storage container 15 along the longitudinal direction L. As each container carrier 17 is moved from one of the first and second conveyor segments 16 and 18 to the other, the container carrier 17 is separated from the container carriers 17 supported by the first and second conveyor segments 16 and 18, thereby avoiding collisions between the moving container carrier 17 and the container carriers 17 supported by the first and second conveyor segments 16 and 18. As a result, the storage containers 15 supported by the first and second conveyor segments 16 and 18 can be spaced closer to one another than in comparable carousel systems where all of the storage units are rotated concurrently.

Returning back to FIG. 2, each of the at least one movement system 50(1) to 50(4) can be configured to engage the container carriers 17 to push the container carriers 17 along the tracks of the upper and lower conveyor segments 16 and 18. The at least one movement system 50(1) to 50(4) and the vertical lifts 60(1) and 60(2) can operate in alternating fashion. Thus, the at least one movement system 50(1) to 50(4) can push container carriers 17 along the longitudinal direction L, while the vertical lifts 60(1) and 60(2) are not transferring container carriers 17 along the vertical direction V. The first and second vertical lifts 60(1) and 60(2) can be configured to transfer container carriers 17 along the vertical direction, while the at least one movement system 50(1) to 50(4) is not pushing container carriers 17 along the longitudinal direction L.

In some embodiments, the at least one movement system can include a plurality of movement systems 50(1) to 50(4) configured to move the container carriers 17. For instance, the storage module 10 can include a first movement system 50(1) that is configured to engage an container carrier 17 so as to push the container carrier 17 towards the second module end 14. The container carrier 17 engaged by the first movement system 50(1) in turn pushes the downstream container carriers 17 towards the second module end 14. The first movement system 50(1) can push the container carriers 17 along the longitudinal direction without any container carriers 17 moving from one of the upper and lower conveyor segments 16 and 18 to the other of the upper and lower conveyor segments 16 and 18 along the vertical direction V.

The storage module 10 can include a second movement system 50(2) that is configured to engage an container carrier 17 so as to push the container carrier 17 towards the first module end 12. The container carrier 17 engaged by the second movement system 50(2) in turn pushes the downstream container carriers 17 towards the first module end 12. The second movement system 50(2) can push the container carriers 17 along the longitudinal direction without any container carriers 17 moving from one of the upper and lower conveyor segments 16 and 18 to the other of the upper and lower conveyor segments 16 and 18 along the vertical direction V.

The storage module 10 can include a third movement system 50(3) that is configured to engage a container carrier 17 so as to push the container carrier 17 towards the second module end 14. The container carrier 17 engaged by the third movement system 50(3) in turn pushes the downstream container carriers 17 towards the second module end 14. The third movement system 50(3) can be spaced from the first movement system 50(1) along the lateral direction A, and can be configured to operate together with the first movement system 50(1). Thus, the first movement system 50(1) can be configured to engage an container carrier 17 at its first carrier side 26a, and the third movement system 50(3) can be configured to engage the container carrier 17 at its second carrier side 26b.

The storage module 10 can include a fourth movement system 50(4) that is configured to engage an container carrier 17 so as to push the container carrier 17 towards the first module end 12. The container carrier 17 engaged by the fourth movement system 50(4) in turn pushes the downstream container carriers 17 towards the first module end 12. The fourth movement system 50(4) can be spaced from the second movement system 50(2) along the lateral direction A, and can be configured to operate together with the second movement system 50(2). Thus, the second movement system 50(2) can be configured to engage an container carrier 17 at its first carrier side 26a, and the fourth movement system 50(4) can be configured to engage the container carrier 17 at its second carrier side 26b.

Turning now to FIG. 5, a side view is shown of a first corner of the storage module 10 defined by the first module end 12 and the second module side 13 (in FIG. 2). In this view, the container carriers 17 are shown in shadow lines, the storage containers 15 are omitted, and the brackets 53 supporting the actuators 51 are removed for clarity. It will be understood that the second corner of the first module end 12 (i.e., at the first module side 11) can be a substantial mirror image of the first corner about a plane that extends along the vertical direction V and longitudinal direction L, although embodiments of the disclosure are not so limited. Further, the second module end 14 can be implemented as a mirror image of the first module end 12 about a plane that extends along the vertical direction V and lateral direction A, although embodiments of the disclosure are not so limited. Thus, the following description can apply similarly to the second corner of the first module end 12 and to both corners of the second module end 14.

Each movement system 50(1) to 50(4) includes an actuator 51, and a catch 52 that is coupled to at least one tack follower 110 of the actuator 51, such as a pair of the track followers 110. The catch 52 can include a first carrier engagement surface 56 (see also FIG. 11) that is aligned with one of the first and second conveyor segments 16 and 18 along the longitudinal direction L. The first carrier engagement surface 56 is configured to engage a container carrier 17 so as to push the container carrier 17 along the longitudinal direction L. For example, the first carrier engagement surface 56 can be positioned so as to engage and push container carriers 17 from a respective one of the first and second vertical lifts 60(1) and 60(2) onto the upper conveyor segment 16 in a first longitudinal direction when the storage module 10 operates in a first rotational direction (e.g., clockwise or counter clockwise). The first carrier engagement surface 56 can be configured to engage an engagement feature 37 of a container carrier 17. The first engagement surface 56 can extend along the vertical direction V and lateral direction A, and can face inwardly.

The catch 52 can include a second carrier engagement surface 56 that is aligned with the other one of the first and second conveyor segments 16 and 18 along the longitudinal direction L. The first and second carrier engagement surfaces 56 can be spaced from one another along the vertical direction V. The second carrier engagement surface 56 is configured to engage a container carrier 17 so as to push the container carrier 17 along the longitudinal direction L. For example, the second carrier engagement surface 56 can be positioned so as to engage and push container carriers 17 from the respective one of the first and second vertical lifts 60(1) and 60(2) onto along the lower conveyor segment 18 in the first longitudinal direction when the storage module 10 operates in a second rotational direction, opposite the first rotational direction. The second carrier engagement surface 56 can be configured to engage an engagement feature 37 of a container carrier 17. The second engagement surface 56 can extend along the vertical direction V and lateral direction A, and can face inwardly. It will be understood that, in embodiments in which the storage module 10 operates in a unidirectional manner, the catch 52 can be implemented with just one of the first and second carrier engagement surfaces 56.

The catch 52 can be implemented as a plate 58 that is attached to the at least one track follower 110. The plate 58 can include a plate body and the carrier engagement surfaces 56 can be attached to the plate body. In other embodiments, the carrier engagement surfaces 56 can be integral to the plate. In yet other embodiments, the catch 52 can be implemented using structure other than the plate, such as a rod or block, that includes carrier engagement surfaces 56. It will be understood that in alternative embodiments, each movement system 50 can include a pair of carrier engagement surfaces 56 that are each controlled by their own actuator 51, rather than a shared actuator 51. Thus, in such embodiments, each movement system can include a pair of actuators 51 offset from one another along the vertical direction V (one for each of the first and second conveyor segments 16 and 18), and each of the actuators can be coupled to a different carrier engagement surface 56.

The actuator 51 of the movement system can be configured to cause the catch 52 to translate back and forth along the longitudinal direction L. For example, as the roller 102 of the actuator 51 rotates about the axis $A_R$ in a first rotational direction (i.e., clockwise or counterclockwise), the track followers 110 move along the helical track 104. This in turn causes the catch 52 to translate along a first longitudinal direction. As the roller 102 of the actuator 51 rotates about the axis $A_R$ in a second rotational direction (i.e., clockwise or counterclockwise), opposite the first rotational direction, the track followers 110 move along the helical track 104. This in turn causes the catch 52 to translate along a second longitudinal direction, opposite the first longitudinal direction.

Each movement system 50(1) to 50(4) can include a rail 61 (shown in FIG. 2) that extends along the longitudinal direction L. The rail 61 can be a linear bearing rail. The catch 52 can be coupled to the rail 61 and configured to ride along the rail 61 along the longitudinal direction L. Use of the rail 61 can limit the torque placed by the catch 52 on the actuator 51 and can maintain alignment of each carrier engagement surface 56 of the catch 52 with one of the first and second conveyor segments 16 and 18 along the longitudinal direction L.

Although not shown, the storage module 10 can include a plurality of pivoting hooks 80 are configured in a manner similar to, and that operate in a manner similar to, those discussed in PCT/US2018/013920. The pivoting hooks can be configured to engage the container carriers 17 so as to prevent more than a predetermined number of container carriers 17 (e.g., more than one container carrier) on the upper and lower conveyor segments 16 and 18 from moving outwardly onto a respective one of the first and second vertical lifts 60(1) and 60(2).

Referring to FIGS. 2 and 5, each vertical lift 60(1) and 60(2) is configured to transfer container carriers 17 between the upper and lower conveyor segments 16 and 18. In so doing, each vertical lift 60(1) and 60(2) can be configured to be moved between a lowered position, wherein the vertical lift is vertically aligned with the lower conveyor segment 16, and a raised position, wherein the vertical lift is vertically aligned with the upper conveyor segment 18. Each vertical lift 60(1) and 60(2) can be configured to operate in a unidirectional manner to transfer container carriers 17 from one of the upper and lower conveyor segments 16 and 18 to the other one of the upper and lower conveyor segments 16 and 18. Alternatively, each vertical lift 60(1) and 60(2) can be configured to operate in a bidirectional manner to transfer container carriers 17 from the upper conveyor segment 16 to the lower conveyor segment 18 and from the lower conveyor segment 18 to the upper conveyor segment 16.

Each vertical lift 60(1) and 60(2) includes at least actuator 51 that is configured to move container carriers 17 between the lowered and raised positions. In some embodiments, each vertical lift 60(1) and 60(2) can include a first actuator 51 and a second actuator 51 that are spaced from one another along the lateral direction A. The first and second actuators 51 can be configured to operate together to move container carriers 17 between the lowered and raised positions.

Each vertical lift 60(1) and 60(2) can include at least one conveyor surface 67 (shown in the enlarged view of FIG. 5) that is configured to support container carriers 17 thereon. The at least one conveyor surface 67 can be considered to be a carrier engagement surface. Each vertical lift 60(1) and 60(2) can be configured to move its respective at least one conveyor surface 67 between the lowered and raised positions. In the embodiment shown, each conveyor surface 67 is defined by a track 66. However, it will be understood that, in alternative embodiments, the at least one conveyor surface can be implemented using any suitable conveyor elements such as tracks, belts, rollers, skate wheels, balls, any other suitable conveyor elements for translating the container carriers 17, or any suitable combination of conveyor elements.

Figure 13:
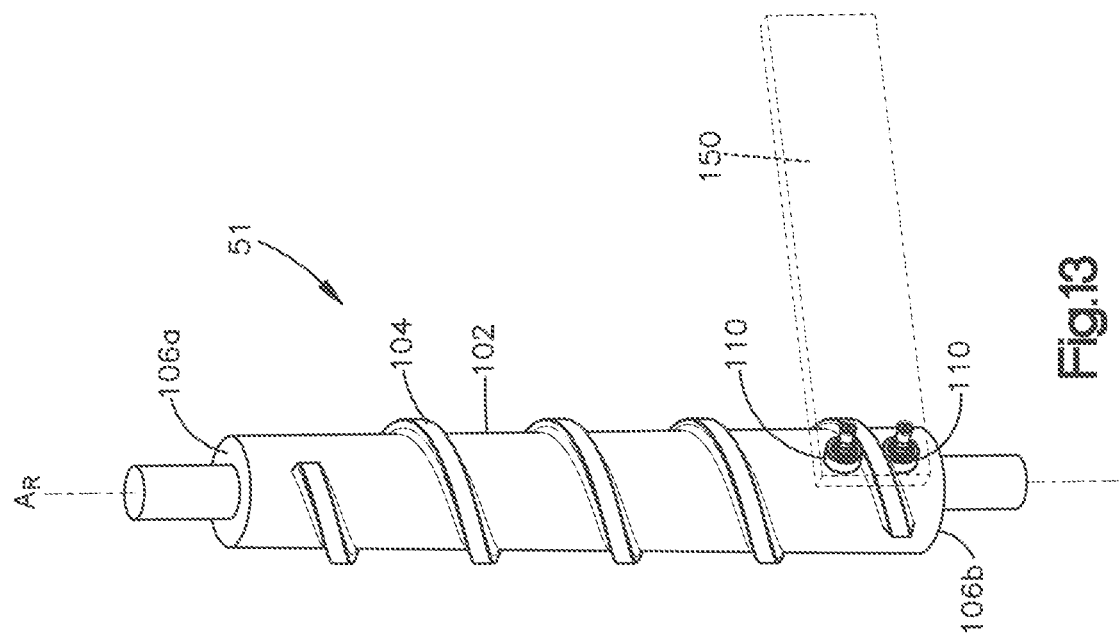
FIG. 13 shows an example load attached to the actuator of FIG. 9, where the load is oriented at a first position along the roller.

With reference to FIGS. 5 and 13, the track followers 110 of each actuator 51 of the vertical lifts 60(1) and 60(2) can be coupled to a respective one of the conveyor surfaces 67. Thus, the track followers 110 of each actuator 51 can couple a respective one of the conveyor surfaces 67 to the helical track 104 of the actuator 51. Each actuator 51 of the vertical lifts is configured to raise its conveyor surface 67 to a raised position where the conveyor surface 67 is aligned with the conveyor surface of one of the upper tracks of the upper conveyor segment 16. Each actuator 51 of the vertical lifts is further configured to lower its conveyor surface 67 to a lowered position where the conveyor surface 67 is aligned with one of the lower tracks of the lower conveyor segment 18. Each conveyor surface 67 is configured to support wheels 34 of the container carriers 17. The container carriers 17 are sized and positioned such that their respective wheels 34 roll along the conveyor surface 67 of the track 66. Optionally, each conveyor surface 67 can be ramped downward as it extends away from a center of the storage module 10 so as to prevent a container carrier 17 on the conveyor surface 67 from rolling from vertical lift towards the upper and lower conveyor segments 16 and 18 as the vertical lift is moving between the raised and lowered positions. The ramped surface 67 can further be used to create separation between a container carrier 17 received on the ramped surface 67 and the container carriers 17 that are disposed on the upper and lower conveyor segments 16 and 18.

The actuator 51 of each vertical lift can be configured to cause a respective one of the tracks 66 to translate up and down along the vertical direction V. For example, as the roller 102 of the actuator 51 rotates about the axis $A_R$ in a first rotational direction (i.e., clockwise or counterclockwise), the track followers 110 to move along the helical track 104. This in turn causes the conveyor surface 67 to translate along a first vertical direction (i.e., up or down). As the roller 102 of the actuator 51 rotates about the axis $A_R$ in a second rotational direction (i.e., clockwise or counterclockwise), opposite the first rotational direction, the track followers 110 to move along the helical track 104. This in turn causes the conveyor surface 67 to translate along a second vertical direction (i.e., up or down), opposite the first vertical direction.

Each vertical lift 60(1) and 60(2) can include a rail 76 that extends along the vertical direction V. The rail 76 can be a linear rail. The rail 76 can be supported by a support 71. The conveyor surface 67 can be configured to ride up and down the rail 76 along the vertical direction V as the track moves between the raised and lowered positions. The conveyor surface 67 can be coupled to the rail 76. For example, an outermost end of the track 66 that supports the conveyor surface 67 can be coupled to the rail 76 such that the track 66 is cantilevered inwardly towards a center of the storage module 10. The track 66 can be coupled to the at least one track follower 110 between the outermost end of the track 66 and an innermost end of the track 66. For instance, the track 66 can be coupled to the at least one track follower 110 at a location that is spaced from the outermost end of the track 66 along the longitudinal direction L. Use of the rail 76 can limit the amount of torque placed by the track 66 on the at least one track follower 110 and can maintain the track 66 in an upright orientation such that the track 66 can be aligned with the upper and lower conveyor segments 16 and 18.

Referring to FIGS. 5 to 8, one method of transferring the container carriers 17 around the movement path 19 in a clockwise direction will be described. In the following discussion, the operation of the storage module 10 at the corner defined by the first module end 12 and the second module side 13 is described. It will be understood that the operation of the storage module 10 at the corner defined by the first module end 12 and the first module side 11 can be identical. In FIG. 5, the vertical lift 60(1) is in the lowered position and the movement system 50(3) is in a first position, which may also be referred to as an outward position. A first container carrier 17(1) is pushed from the lower conveyor segment 18 onto the vertical lift 60(1). In particular, the movement systems 50(2) and 50(4) at the second module end 14 (shown in FIG. 2) push a plurality of container carriers 17 along the lower conveyor segment 18, which in turn push the first container carrier 17(1) onto the vertical lift 60(1). A pivoting hook (not shown) similar to those described in PCT/US2018/013920 can be lowered so as to engage a second container carrier 17(2) that is immediately upstream of the first container carrier 17(1) so as to ensure that the second container carrier 17(2) does not move into the path of the vertical lift 60(1).

In FIG. 6, the vertical lift 60(1) moves the first container carrier 17(1) from the lowered position to the raised position. As the vertical lift 60(1) moves the first container carrier 17(1), at least some, up to all, of the container carriers 17 on the upper and lower conveyor segments 16 and 18 can remain stationary. In the raised position, the engagement feature 37 of the first container carrier 17(1) is in vertical alignment with the upper carrier engagement surface 56 of the catch 52.

Figure 7:
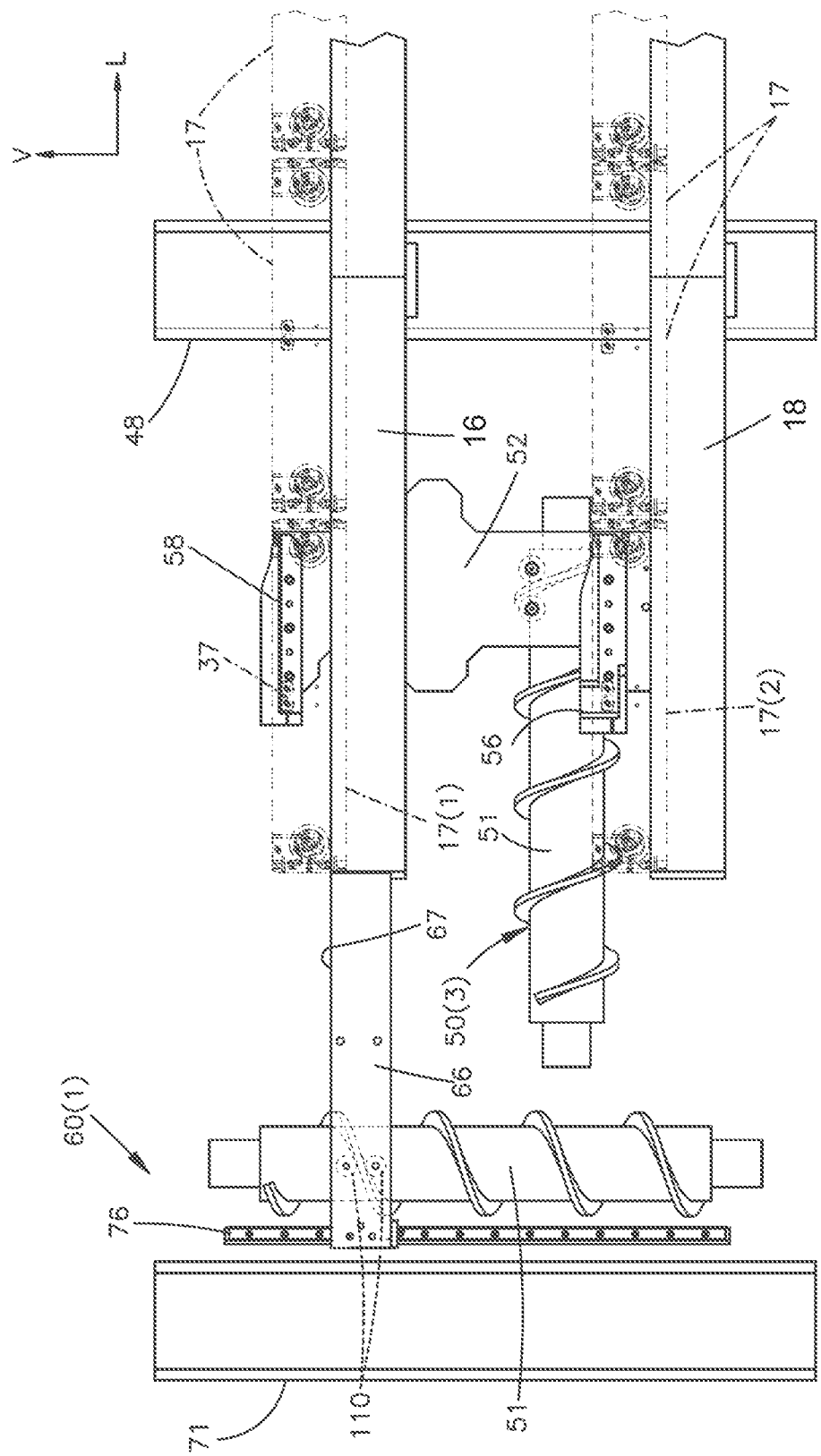
FIG. 7 shows a side view of the corner of FIG. 5 with the movement system in a second position and the vertical lift in the raised position.

In FIG. 7, the actuator 51 moves the catch 52 along the longitudinal direction L towards the second module end 14 from the first position to a second position, which may be referred to as an inward position, thereby causing the upper carrier engagement surface 56 to push the first container carrier 17(1) from the vertical lift 60(1) onto the upper conveyor segment 16. Movement of the first container carrier 17(1) in turn pushes the downstream container carriers 17 on the upper conveyor segment 16 until one of the container carriers (not shown in FIG. 7) is transferred from the upper conveyor segment 16 onto the second vertical lift 60(2) (not shown in FIG. 7).

In FIG. 8, the vertical lift 60(1) is returned from the raised position to the lowered position. As the vertical lift 60(1) is returned to the lowered position, at least some, up to all, of the container carriers 17 on the upper and lower conveyor segments 16 and 18 can remain stationary. The steps of FIGS. 5-8 can then be repeated to transfer the second container carrier 17(2) to the upper conveyor segment 16.

It will be noted that the second module end 14 operates in a similar manner such that the second vertical lift 60(2) transfers container carriers 17 from the upper conveyor segment 16 to the lower conveyor segment 18. It will be understood that the process can also be reversed such that the first vertical lift 60(1) transfers container carriers 17 from the upper conveyor segment 16 to the lower conveyor segment 18, and the second vertical lift 60(2) transfers container carriers 17 from the lower conveyor segment 18 to the upper conveyor segment 16.

Turning now to FIG. 17, each storage module can be modular in the sense that each storage module can be fully functional on its own, and multiple instances of the storage modules can be grouped together. For example, FIG. 17 shows a modular storage and retrieval system 90 according to one example embodiment that comprises a plurality of instances of the storage module 10 of FIG. 1, each supporting a plurality of storage container 15. In general, storage systems of the disclosure can include at least one vertical stack of storage modules that comprises at least two of the storage modules stacked on top of one another along the vertical direction V. In at least some embodiments, the system 90 can include the storage containers 15 supported by the system 90, although it will be understood that the system 90 can be made and sold without the storage containers 15.

The storage system 90 comprises a first system end 91, and a second system end that is spaced from the first system end 91 along the longitudinal direction L. The storage system 90 includes a plurality of instances of the storage module 10, each extending from the first system end 91 to the second system end. The plurality of storage modules 10 includes a first vertical stack 93 of the storage modules 10 that comprises a plurality (e.g., at least two) of the storage modules 10 stacked on top of one another along the vertical direction V. The storage system 90 further includes a second vertical stack 94 of the storage modules 10 that comprises a plurality (e.g., at least two) of the storage modules 10 stacked on top of one another along the vertical direction V. The second vertical stack 94 can be offset from the first vertical stack 93 along the lateral direction A.

Each storage module 10 of the system 90 can be independently operated such that storage containers 15 of each storage module 10 can be driven around their corresponding movement path independently of the storage containers 15 of other storage modules 10 being driven around their corresponding movement path. Although two vertical stacks 93 and 94, each having two storage modules 10 are shown, it will be understood that the number of vertical stacks and the number of storage modules 10 in each vertical stack can vary from that shown. In particular, modular storage and retrieval systems of the disclosure can include at least one vertical stack of storage modules 10 or more than one vertical stack of storage modules 10. Further, each vertical stack of storage modules 10 can have at least two storage modules 10 stacked on top of one another or more than two storage modules 10. Thus, height, width, and length of the system 90 can be scalable to fit within a desired volume in a warehouse space.

The modular storage and retrieval storage system 90 can include supports 95 that are coupled to the conveyor segments in each storage module 10 in each vertical stack 93 and 94 so as to maintain the storage modules 10 in a stacked relation. The supports 95 can further be coupled to laterally adjacent storage modules 10 so as to attach the vertical stacks 93 and 94 of storage modules 90 to one another. The supports 95 can combine to form a frame of the system 90. Note that each support 95 can be formed by coupling or fastening the corresponding supports (see e.g., 48, 71 in FIG. 2) of vertically stacked storage modules 10 to one another, or by making the corresponding supports integral to one another.

The storage modules 10 can be stacked on top of one another so that the space between the storage containers 15 of each storage module 10 and a storage module 10 immediately over top of the storage module 10 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers 15, such as a spacing that is no more than 20 percent of the height of the storage container 15, such as no more than 15 percent of the height of the storage container 15, such as no more than 10 percent of the height of the storage container 15, or such as no more than 5 percent of the height of the storage container 15. Storage density is inversely proportional to the distance between the storage containers 15 of vertically adjacent storage modules 10. Thus, as this distance is decreased, the storage density increases.

The modular storage and retrieval system 90 can also include at least one robotic manipulator 96 and at least one controller 24. For example, the system 90 can include at least one robotic manipulator 96 that services the first system end of each storage module 10 in a vertical stack. The system 90 can additionally or alternatively include at least one robotic manipulator 96 that services the second system end 14 of each vertical stack of storage modules 10 as shown. In some embodiments, the manipulators 96 at the first system end 91 can be used to stow inventory items or storage containers 15 in the storage modules 10, and the manipulators 96 at the second system end can be used to retrieve inventory items or storage containers 15 from the storage modules 10. Alternative embodiments can include at least manipulator 96 on only one end of a vertical stack, the at least one manipulator 96 configured to perform both stowing and retrieving operations. Additionally or alternatively, one or more of the robotic manipulators 96 can service multiple vertical stacks of storage modules 10. Although not shown, in some embodiments, the at least one robotic manipulator 96 can be configured to move vertically and/or horizontally to service the storage modules 10 of the system 90. For example, a robotic manipulator 96 can be mounted on a horizontal and/or vertical track to enable it to move with respect to the vertical stacks.

The robotic manipulator may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). The robotic manipulator may include any suitable type and number of sensors disposed throughout the robotic manipulator (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator, including an end effector.

The sensors may be in communication with a management device that is local to the robotic manipulator (e.g., a robotic manipulator controller) and/or may be in direct communication with an item movement management system. In this manner, the management device may control the operation of the robotic manipulator and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

In some examples, depending on the application for the robotic manipulator, different end effectors (e.g., end of arm tools) may be selected. Information about the end effectors available may be organized in terms of grasping function. A grasping function may define functionally how an end effector is capable of manipulating an object. The grasping function may differ between end effectors with respect to capacities, categories, and physical limitations. Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

Other material conveyance devices (not shown) may also be disposed adjacent to the robotic manipulators 96. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices can be used to transport inventory items and/or storage containers to and from the robotic manipulators 96. In some examples, the robotic manipulators or other material handling device may be configured to move vertically and/or horizontally to service the cluster. For example, the robotic manipulator may be mounted on a horizontal and/or vertical track to enable it to move with respect to the vertical stacks. Other material conveyance devices may also be disposed on each floor adjacent to the robotic manipulators. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices may be used to transport items and/or storage containers 15 to and from the robotic manipulators. In some examples, first other material conveyance devices transport items to the robotic manipulators for placement in the storage containers of the stackable storage modules. Second other material conveyance devices may transport other items from the robotic manipulators (e.g., items that have been removed from the storage containers 15 of the stackable storage modules) to other locations within the facility (e.g., packaging, labeling, inspection, etc.).

The modular storage and retrieval system 90 may include means for inspection, repairs, and removal of jams of the stackable storage modules. As described herein, the vertical stacks may also be moveable to allow access to all of the stackable storage modules. Additionally or alternatively, movement system components such as motors and other components may be positioned near the first module end 12 and/or near the second module end 14 for ease of access for maintenance.

In operation, a method of operating the system 90 comprises causing a desired storage container 15 in the system 90 to be identified to either retrieve an inventory item from or stow an inventory item into. Further, the method comprises causing a location of the storage container 15 in the system 90 to be identified. Identifying the location can include identifying the storage module 10 and optionally the position of the storage container 15 on the identified storage module 10. Once the location is identified, the method comprises causing the container carriers 17, and hence the storage containers 15, of the identified storage module 10 to be translated around the movement path of the identified storage module 10 until the desired storage container 15 is presented at a desired one of the first and second ends 12 and 14 of the identified storage module 10. The translating steps can be performed in a manner similar to that described above in relation to FIGS. 5-8.

The method then comprises retrieving an inventory item from the desired storage container 15, or stowing an inventory item into the desired storage container 15. This step can be performed by a human who manually retrieves an inventory item from the desired storage container 15 or stows the inventory item into the desired storage container 15. Alternatively, this step can comprise causing a robotic manipulator 96 to move so as to retrieve an inventory item from the desired storage container 15, or stow an inventory item into the desired storage container 15. In some embodiments, the human or robotic manipulator 96 can retrieve the desired storage container 15 itself from the system 90, and then the inventory item can be retrieved from the desired storage container 15. The storage container 15 can then be stowed by the human or a robotic manipulator 96 onto a desired one of the storage modules 10. In so doing, the storage container 15 can be stowed onto the same storage module 10 from which the storage container 15 was retrieved or can be stowed in a different storage module. At least one, up to all, of these steps can be controlled by the controller 24.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A storage module configured to store inventory items, the storage module comprising:
   first and second module ends that are spaced from one another;
   a plurality of conveyor segments that define a movement path that has a closed shape between the first and second module ends, the plurality of conveyor segments including first and second conveyor segments that are configured to carry the inventory storage containers along a longitudinal direction between the first and second module ends, and third and fourth conveyor segments that are configured to carry the inventory storage containers between the first and second conveyor segments; and
   at least one actuator configured to move inventory storage containers along the movement path, each of the at least one actuator comprising:
   a roller having a cylindrical body that has a first end and a second end that are offset from one another along a central axis, and that has a cylindrical outer surface that extends from the first end to the second end;
   a helical track disposed around the cylindrical outer surface in a helical pattern; and
   at least one track follower configured to ride along the helical track when the roller is rotated about the central axis so as to move the inventory storage containers along an axial direction that is substantially parallel to the central axis,
   wherein the storage module is configured to translate the inventory storage containers around the movement path until a desired one of the inventory storage containers is presented at one of its first and second module ends.

2. The storage module of claim 1, wherein the actuator comprises an internal motor that is disposed within the cylindrical body and that is configured to rotate the cylindrical outer surface about the central axis.

3. The storage module of claim 1, wherein each track follower comprises a roller that is configured to roll along the at least one guide surface.

4. The storage module of claim 1, wherein the helical track defines a helical path, and the helical track has at least one guide surface that is configured to guide the at least one track follower along the helical path as the outer cylindrical surface is rotated about the central axis.

5. The storage module of claim 4, wherein the at least one guide surface includes first and second guide surfaces that are opposite from one another, and the at least one track follower includes first and second track followers that are configured to ride along the first and second guide surfaces, respectively, as the outer cylindrical surface is rotated about the central axis.

6. The storage module of claim 1, wherein the first and second conveyor segments are spaced from one another along a vertical direction, and the at least one actuator comprises an actuator having a central axis that is aligned with the vertical direction such that the actuator is configured to move the inventory storage containers between the first and second conveyor segments along the vertical direction.

7. The storage module of claim 6, wherein the third conveyor segment is implemented as a first vertical lift that is configured to move the inventory storage containers between the first and second conveyor segments along the vertical direction, and the first vertical lift includes the actuator and a conveyor surface that is coupled to the at least one track follower of the actuator, wherein the first vertical lift is configured such that, when the actuator is actuated, the conveyor surface moves between the first and second conveyor segments along the vertical direction.

8. The storage module of claim 7, wherein the first vertical lift is disposed at the first module end, and the fourth conveyor segment is implemented as a second vertical lift disposed at the second module end, the second vertical lift configured to move the inventory storage containers between the first and second conveyor segments along the vertical direction.

9. The storage module of claim 1, wherein the at least one actuator comprises an actuator having a central axis that is aligned with the longitudinal direction such that the actuator is configured to move the inventory storage containers along at least one of the first and second conveyor segments along the longitudinal direction.

10. The storage module of claim 9, comprising a movement system that includes the actuator and a catch that is coupled to the at least one track follower of the actuator, wherein the movement system is configured such that, when the actuator is actuated, the catch engages a container carrier that is configured to support at least one of the inventory storage containers and pushes the container carrier along at least one of the first and second conveyor segments along the longitudinal direction.

11. The storage module of claim 10, wherein the movement system is configured to engage a container carrier so as to push the container carrier along the longitudinal direction towards the second module end, and the storage module comprises a second movement system that is configured to engage a container carrier so as to push the container carrier along the longitudinal direction towards the first module end.

12. The storage module of claim 10, wherein the at least one actuator comprises a second actuator having a central axis that is aligned with a vertical direction such that the second actuator is configured to move the inventory storage containers between the first and second conveyor segments along the vertical direction.

13. A method of processing inventory, the method comprising:
  identifying a desired storage container from a plurality of storage containers supported by a storage module, the storage module having a plurality of conveyor segments that define a movement path that has a closed shape, and each storage container configured to store at least one inventory item therein;
  translating the storage containers around the movement path until the desired storage container is presented at a desired one of first and second module ends of the storage module; and
  causing an inventory item to be retrieved from, or stowed into, the desired storage container,
  wherein the translating step comprises:
    rotating a cylindrical outer surface of a roller of an actuator of the storage module about a central axis to thereby cause a helical track disposed around the cylindrical outer surface to rotate; and
    causing at least one track follower of the actuator to ride along at least one guide surface of the helical track such that the at least one track follower causes storage containers to move along the movement path along an axial direction that is substantially parallel to the central axis, wherein the axial direction is aligned with a longitudinal direction that extends between the first and second module ends, and the translating step comprises causing the at least one track follower to move the storage containers along the longitudinal direction along at least one of first and second conveyor segments of the plurality of conveyor segments that extend between the first and second module ends; and
  causing at least one actuator of a vertical lift of the storage module to move the storage containers along the movement path along a vertical direction between the first and second conveyor segments.

14. The method of claim 13, wherein the translating step comprises causing the at least one track follower to move a catch that is coupled to the at least one track follower along the longitudinal direction such that the catch engages a container carrier that is configured to support at least one of the storage containers and pushes the container carrier along the longitudinal direction.

15. The method of claim 13, wherein the rotating step comprises causing an internal motor that is disposed within the cylindrical outer surface to rotate the cylindrical outer surface.

16. A method of processing inventory, the method comprising:
  identifying a desired storage container from a plurality of storage containers supported by a storage module, the storage module having a plurality of conveyor segments that define a movement path that has a closed shape, and each storage container configured to store at least one inventory item therein;
  translating the storage containers around the movement path until the desired storage container is presented at a desired one of first and second module ends of the storage module; and
  causing an inventory item to be retrieved from, or stowed into, the desired storage container,
  wherein the translating step comprises:
    rotating a cylindrical outer surface of a roller of an actuator of the storage module about a central axis to thereby cause a helical track disposed around the cylindrical outer surface to rotate; and
    causing at least one track follower of the actuator to ride along at least one guide surface of the helical track such that the at least one track follower causes storage containers to move along the movement path along an axial direction that is substantially parallel to the central axis, wherein the axial direction is aligned with a vertical direction, and the at least one track follower causes the storage containers to move along the movement path along the vertical direction between first and second conveyor segments of the plurality of conveyor segments that are configured to carry storage containers along a longitudinal direction between the first and second module ends.

17. The method of claim 16, wherein the translating step comprises causing the at least one track follower to move a conveyor surface of a vertical lift of the storage module between the first and second conveyor segments along the vertical direction.

\* \* \* \* \*